United States Patent
Wagner et al.

(10) Patent No.: US 8,491,879 B2
(45) Date of Patent: Jul. 23, 2013

(54) AMMONIUM-POLYURETHANE- AND/OR POLYCARBONATE COMPOUNDS

(75) Inventors: Roland Wagner, Bonn (DE); Karl-Heiz Sockel, Leverkusen (DE); Walter Simon, Leverkusen (DE)

(73) Assignee: Momentive Performance Materials GmbH, Leverkusen (DE)

( * ) Notice: Subject to any disclaimer, the term of this patent is extended or adjusted under 35 U.S.C. 154(b) by 298 days.

(21) Appl. No.: 12/921,798

(22) PCT Filed: Mar. 5, 2009

(86) PCT No.: PCT/EP2009/052593
§ 371 (c)(1),
(2), (4) Date: Oct. 28, 2010

(87) PCT Pub. No.: WO2009/112417
PCT Pub. Date: Sep. 17, 2009

(65) Prior Publication Data
US 2011/0033411 A1 Feb. 10, 2011

(30) Foreign Application Priority Data
Mar. 11, 2008 (DE) .......................... 10 2008 013 583

(51) Int. Cl.
*A61K 31/74* (2006.01)

(52) U.S. Cl.
USPC ....................................................... 424/78.08

(58) Field of Classification Search
None
See application file for complete search history.

(56) References Cited

U.S. PATENT DOCUMENTS

| 5,606,077 A | 2/1997 | Lersch et al. |
| 5,672,338 A | 9/1997 | Berthiaume |
| 2007/0092656 A1 | 4/2007 | Keul et al. |

OTHER PUBLICATIONS

Novi et al, Ammonium-Functionalized Polydimethylsiloanes: Synthesis and Properties, Macromol. Chem. Phys., 2006, 207, 273-286.*
Novi et al. "Ammonium-Functionalized Polydimethylsiloxanes: Synthesis and Properties," Macromol. Chem. Phys., vol. 207, 2006, pp. 273-286.
International Search Report for corresponding PCT/EP2009/052593, mailed Jun. 23, 2009, three pages.

* cited by examiner

*Primary Examiner* — Paul Dickinson
(74) *Attorney, Agent, or Firm* — Rankin, Hill & Clark LLP

(57) ABSTRACT

The invention relates to novel compounds, in particular ammonium-polyurethane and/or polycarbonate compounds, in particular ammonium-polyurethane-polydiorganosiloxane and/or polycarbonate-polydiorganosiloxane compounds, methods for their production as well as their use.

23 Claims, No Drawings

AMMONIUM-POLYURETHANE- AND/OR POLYCARBONATE COMPOUNDS

The invention relates to novel compounds, in particular ammonium-polyurethane and/or polycarbonate compounds, in particular ammonium-polyurethane-polydiorganosiloxane and/or polycarbonate-polydiorganosiloxane compounds, methods for their production as well as their use.

Siloxane block copolymers containing quaternary ammonium structures are widely known. On the one hand, they may be diblock copolymers of the type comprising siloxane and quaternary ammonium units (DE 3340708, EP 282720, U.S. Pat. No. 6,240,929, U.S. Pat. No. 6,730,766). On the other hand, triblock copolymers have been developed that are based on the combination siloxane/quaternary ammonium/polyether block unit (WO 02/10256, WO 02/10257, WO 02/10259, WO 2004/090007, WO 03/078504, WO 2004/041912, WO 2004/042136). The most important advantage of these triblock copolymers is that their structures are flexible and can be adapted, within very large ranges, to the concrete product requirements.

Moreover, it is known to react siloxanes terminated with amino groups with hydrocarbon-based diisocyanates to form diblock copolymers containing urea groups (US 2006/0036055 and Silicone, Chemie and Technologie, Vulkan Verlag Essen 1989, pp. 94-96). Analogous urethane derivatives are also described (US 2004/0087752).

Quaternary ammonium compounds containing urea and urethane groups are known from GB 1128642. The reaction of amino or hydroxy-terminated siloxanes with diisocyanates leads to isocyanate-terminated intermediate stages, which then react, for example, with primary-tertiary di- or triamines, whereupon the tertiary amino group is quaternized. It is possible to use, for example, oligoethylene glycols as chain extenders, which, however, directly leads to a decrease of the amount of quaternary ammonium groups due to the consumption of isocyanate groups. Thus, this solution is disadvantageous in that a flexible structural adaptation to the concrete product requirements that encompasses large ranges cannot be carried out.

Moreover, it is known to react carbonate-functionalized siloxanes with hydrocarbons containing primary and secondary amino groups or hydroxyl groups into silicones or corresponding ethers containing urethane groups (U.S. Pat. No. 5,672,338, U.S. Pat. No. 5,686,547, DE 195 05 892).

The use of an asymmetrically substituted carbonate as a linker group for the synthesis of siloxane-modified diquaternary compounds containing urethane groups has also been proposed (WO 2005/058863).

Finally, the use of this asymmetrically substituted carbonate linker in the synthesis of polyurethane block copolymers containing siloxane units with incorporated amine salt units was also described (C. Novi, A. Mourran, H. Keul, M. Möller, Macromol. Chem. Phys. 2006, 207, 273-286). The drawback of these compounds is that they only possess pH-sensitive charges in the form of amine salts, which results in reduced substantivity.

A fundamental disadvantage of the two latter solutions based on the carbonate linker is that an economically viable synthesis of the linkers is done via phosgene, which greatly limits accessibility.

It is thus the object of the invention to provide block copolymers containing quaternary ammonium groups and siloxane units, which, on the one hand, are based on the incorporation of carbonates, without a reaction step with phosgene having to be involved, and in which a flexible structural adaptation to the concrete product requirements is possible which encompasses large ranges.

Surprisingly, the object posed is solved by polyurethane and/or polycarbonate block copolymers containing quaternary ammonium groups and preferably, polydiorganosiloxane units.

The invention provides novel compounds, comprising at least one structural element of the formula (1):

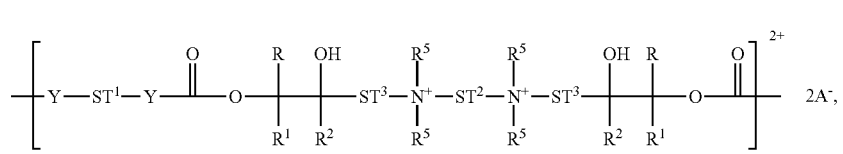

wherein

R is respectively selected from the group consisting of: hydrogen and alkyl, $R^1$ is respectively selected from the group consisting of: hydrogen and alkyl, $R^2$ is respectively selected from the group consisting of: hydrogen and alkyl, $ST^1$ is a di- or polyvalent, straight-chained, cyclic or branched, saturated, unsaturated or aromatic, substituted or unsubstituted hydrocarbon residue with up to 1000 carbon atoms, which may contain one or more groups selected from:

—O—,

—C(O)—,

—NH—,

—$NR^3$—, wherein $R^3$ is defined as below, and a polyorganosiloxane unit with 2 to 1000 silicon atoms, Y is selected independently from one another from: —O—, —S— and —$NR^6$—, wherein $R^6$ is hydrogen or a straight-chained, cyclic or branched, saturated, unsaturated or aromatic hydrocarbon residue with up to 40 carbon atoms, which may contain one or more groups selected from —O—, —C(O)—, —NH—and —$NR^3$—, wherein $R^3$ is defined as above, or two residues $R^6$ together form an alkylene residue while forming a cyclic structure with $ST^1$, or one or more residues $R^6$ represent a bond to $ST^1$ while forming one or more cyclic structures with $ST^1$, $ST^2$ is a di- or polyvalent, straight-chained, cyclic or branched, saturated, unsaturated or aromatic, substituted or unsubstituted hydrocarbon residue with up to 1000 carbon atoms, which may contain one or more groups selected from:

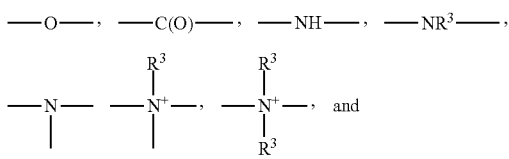

a polyorganosiloxane unit with 2 to 1000 silicon atoms, wherein

R$^3$ is a straight-chained, cyclic or branched, saturated, unsaturated or aromatic hydrocarbon residue with up to 40 carbon atoms, which may contain one or more groups selected from —O—, —C(O)— and —NH—, and may optionally be substituted by a silyl group, and R$^5$ is a straight-chained, cyclic or branched, saturated, unsaturated or aromatic hydrocarbon residue with up to 100 carbon atoms, which may contain one or more groups selected from —O—, —C(O)— and —NH—, and may optionally be substituted by a silyl group, or two of the residues R$^5$ form an alkylene residue, or one or more of the residues R$^5$ form a bond to the residue ST$^2$ while forming cyclic structures, ST$^3$ is a di- or polyvalent, straight-chained, cyclic or branched, saturated, unsaturated or aromatic, substituted or unsubstituted hydrocarbon residue with up to 30 carbon atoms, which may contain one or more groups selected from:

—O—,
—C(O)—, wherein

A$^-$ is an organic or inorganic anion.

In a preferred embodiment of the compounds according to the invention, at least one of the residues R, R$^1$ and R$^2$ represents hydrogen; particularly preferably, all the residues R, R$^1$ and R$^2$ represent hydrogen. Alkyl, as a possible residue R, R$^1$ and R$^2$ preferably includes straight-chained or branched alkyl residues with 1 to 6 carbon atoms, such as, in particular, methyl, ethyl, propyl.

The compounds according to the invention preferably comprise at least one polydiorganosiloxane unit. The polydiorganosiloxane unit lends softening properties to the compounds according to the invention when they are applied to a substrate.

On average, the compounds according to the invention preferably contain more than one structural element of the formula (1), particularly preferably, they have, on average, about 2 to 20 structural elements of the formula (1).

Preferably, the compounds according to the invention comprise at least two structural elements of the formula (1), more preferably at least 3 structural elements of the formula (1). However, it is also included in the scope of the invention that the compounds according to the invention have only one structural element of the formula (1), which sometimes are also referred to as "butterfly" compounds. Examples for such compounds include:

Such compounds can be produced, for example, by reacting
2 mol of the compound of formula (5):

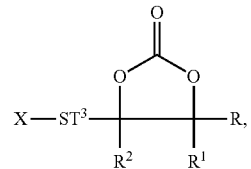

wherein R, R$^1$, R$^2$ and ST$^3$ are as defined above, and X is a leaving group, with one mol of a compound of the formula (2):

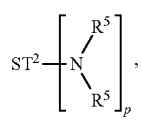

wherein ST$^2$ and R$^5$ are defined as above, and p=2, and simultaneously or subsequently the reaction with 2 mol of a compound of the formula (3)

        (3), wherein ST$^1$ is defined as above, and q=2.

The above reaction also illustrates a possibility of forming terminal groups of the compounds according to the invention. The terminal groups can result from either the non-reacted terminal groups of the polyfunctional monomers used, or reactive monofunctional compounds, such as, for example, CH-acid compounds, such as alcohols, amines, or water, or acids, are added for chain termination.

Furthermore, the compounds according to the invention on average preferably comprise more than one polydiorganosiloxane unit.

In a preferred embodiment of the invention, the compounds according to the invention have a linear structure. In this case, a linear structure means that the polymer main chain formed from the units of the formula (1) is substantially linear, i.e. has no branchings. However, this does permit cyclic structural elements being contained in the linear polymeric main chain.

In a preferred embodiment of the invention, the residues ST$^1$, ST$^2$ and ST$^3$ are each divalent residues. This means that the compounds according to the invention are preferably linear compounds, wherein cyclic structures may be present within the polymer main chain formed by the formula (1), as will be explained below. Branched polycarbonate-polyorganosiloxane and/or polyurethane-polyorganosiloxane compounds are also included in the compounds according to the invention, in particular those in which the branching of the

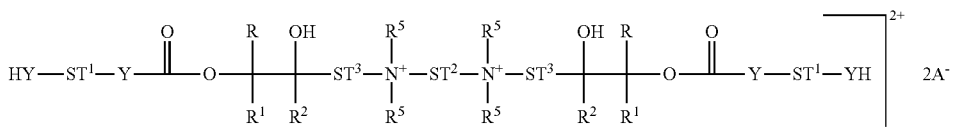

polymeric main chain takes place via at least one of the residues $ST^1$ or $ST^2$, which in this case must naturally be more than divalent.

Moreover, is also possible to cross-link the compounds according to the invention later by means of the hydroxyl groups present using polyisocyanates, polycarboxylic acids or derivatives thereof, such as acid chlorides, or polyepoxides, and compounds cross-linked in this manner are also included in the invention.

Linear compounds are obtained, in particular, starting from starting compounds of the formulae:

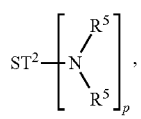  (2)

wherein $ST^2$ and $R^5$ are defined as above, and p=2, and compounds of the formula (3)

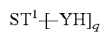  (3), wherein $ST^1$ is defined as above, and q=2.

The compounds according to the invention preferably are linear compounds. Compounds in which $ST^1$, $ST^2$ and $ST^3$ are each divalent residues.

The compounds according to the invention comprise at least one polyorganosiloxane residue of the formula (4):

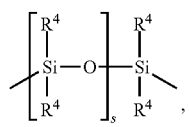  (4)

wherein
$R^4$ is a straight-chained, cyclic or branched, saturated, unsaturated or aromatic hydrocarbon residue with up to 20 carbon atoms, and/or $R^4$ is an alkoxy residue, the alkyl part of which is a straight-chained, cyclic or branched, saturated alkyl residue with up to 20 carbon atoms, which may contain one or more oxygen atoms (such as, for example, in the case of polyalkyleneoxyalkoxy residues), and
s=1 to 999.
Preferred are:
$R^4$ C1 to C20, preferably C1 to C9, straight-chained or cyclic or branched, saturated or unsaturated or aromatic hydrocarbon residue, particularly preferably methyl and phenyl and s 1 to 199, especially 1 to 99.

In a particularly preferred case, the siloxane unit has the structure of a polydimethylsiloxane unit of the formula (4a):

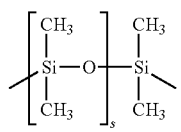  (4a)

wherein s is as specified above.

The following compound, for example, constitutes a compound $ST^1$-$(Y—H)_2$ corresponding to the alternative $R^4$=alkoxy and/or alkyl:

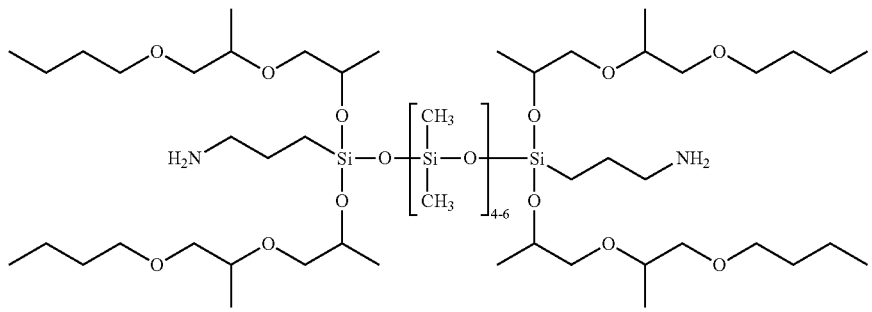

In an embodiment that is particularly suitable for the use of the compounds according to the invention in the field of cosmetics, such as in the field of hair care, s is preferably >199.

In an embodiment that is particularly preferred for the use of the compounds according to the invention as softeners, in particular for textiles, s is preferably 20 to 60, particularly preferably 20 to 53.

Particularly preferably, the polycarbonate-polyorganosiloxane and/or polyurethane-polyorganosiloxane compounds according to the invention contain at least two polyorganosiloxane residues of the formula (4).

Preferably, at least 10 mol-% of the sum of the structural elements $ST^1$ and $ST^2$ on average contain a polydiorganosiloxane unit. This means that, for preparing the compounds according to the invention, mixtures of starting compounds of the formulae (2) and (3)

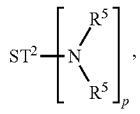  (2)

wherein $ST^2$, $R^5$, p are defined as above,

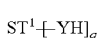  (3), wherein $ST^1$, Y and q are defined as above,
are used, wherein a part of the starting compounds comprises a polydiorganosiloxane unit, another part of the starting compounds comprises no polydiorganosiloxane unit, wherein the ratio of the starting compounds is preferably selected such that at least 10 mol-% of the residues $ST^1$ and $ST^2$ comprise a polydiorganosiloxane unit.

Particularly preferably, only one of the structural elements $ST^1$ or $ST^2$ comprises a polydiorganosiloxane unit. This means that, only the structural element $ST^1$, for example, contains polydiorganosiloxane units, wherein is applies, in that case, that the groups $ST^1$ preferably represent mixtures of polydiorganosiloxane units-containing and polydiorganosiloxane unit-free structural elements, and wherein, preferably, at least 10 mol-% of the $ST^1$ groups on average contain polydiorganosiloxane units. In another preferred embodiment, the polydiorganosiloxane units may also be present only in the structural elements corresponding to $ST^2$, wherein it also applies in that case that, preferably, at least 10 mol-% of the $ST^2$ groups on average contain polydiorganosiloxane units.

The content of polydiorganosiloxane-containing groups $ST^1$ and/or $ST^2$ may also be greater than or equal to 25 mol-%, greater than or equal to 50 mol-%, and even 100 mol-%.

In the compounds according to the invention, preferably $Y=-NR^6-$, wherein $R^6$ is defined as above. In this case, the compounds according to the invention preferably are polyurethane compounds, particularly preferably polyurethane-polyorganosiloxane compounds. Particularly preferably, $Y=-NH-$.

In a preferred embodiment, the compounds according to the invention comprise polyether groups, particularly preferably polyether groups and polydiorganosiloxane groups. This embodiment imparts sufficient hydrophilicity to the compounds according to the invention with good substantivity (resistance to being washed out) on a substrate surface, in particular on fibrous substrate surfaces.

In the compounds according to the invention, $ST^1$ preferably is unequal to $ST^2$.

In a preferred embodiment of the compounds according to the invention, the residues $ST^1$ and/or $ST^2$ are selected from the group consisting of polyorganosiloxane-containing residues, polyether-containing residues, polyorganosiloxane and polyether-containing residues, monocyclic or polycyclic hydrocarbon residues, acyclic, optionally oxygen-containing hydrocarbon residues and optionally oxygen-containing hydrocarbon residues comprising aromatic groups. Preferably, at least one of the residues $ST^1$ and/or $ST^2$ contains a polyalkyleneoxy group.

In a further preferred embodiment of the invention $ST^1$ and/or $ST^2$ contain a structural element of the following formula:

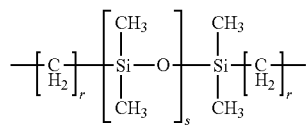

wherein s is as defined above, and r preferably is 1 to 12.

In another preferred embodiment of the compounds according to the invention,
R, $R^1$ and
$R^2$=hydrogen, $ST^1$=straight-chained or cyclic or branched, saturated or unsaturated or aromatic hydrocarbon residue with 2 to 200 carbon atoms, which may optionally contain —O—, —C(O)— and/or a polydiorganosiloxane unit with 2 to 200 silicon atoms, $ST^2$=straight-chained or cyclic or branched, saturated or unsaturated or aromatic hydrocarbon residue with 2 to 200 carbon atoms, which may contain —O—, —C(O)—, —NH—, —$NR^3$—, and optionally a polydiorganosiloxane unit with 2 to 200 silicon atoms, $R^3$=straight-chained or cyclic or branched, saturated or unsaturated or aromatic hydrocarbon residue with up to 10 carbon atoms, which may contain —O—, —C(O)— and —NH—, $ST^3$=a divalent, straight-chained, substituted or unsubstituted hydrocarbon residue with up to 20 carbon atoms, which may contain one or more groups selected from —O— and —C(O)—, $Y=-NR^6-$, wherein
  $R^6$=hydrogen or a straight-chained, cyclic or branched, saturated, unsaturated or aromatic hydrocarbon residue with up to 10 carbon atoms, which may contain one or more groups selected from —O—, —C(O)—, —NH— and —$NR^3$—, wherein $R^3$ is defined as above, and $R^5$=straight-chained or cyclic or branched, saturated or unsaturated or aromatic hydrocarbon residue with up to 25 carbon atoms, which may contain —O—, —C(O)—, —NH—, or
  two of the residues $R^5$ form an alkylene residue, or
  one or more of the residues $R^5$ form a bond to the residue $ST^2$ while forming cyclic structures, $A^-$=inorganic anion, such as halogenide, organic anion, such as carboxylate, alkyl sulfate, sulfonate, provided that at least one of the structural elements $ST^1$ and $ST^2$ comprises a polydiorganosiloxane unit.

In another preferred embodiment of the compounds according to the invention,
R, $R^1$
and $R^2$=hydrogen, $ST^1$=straight-chained or cyclic or branched, saturated or unsaturated or aromatic hydrocarbon residue with 2 to 100 carbon atoms, which may optionally contain —O—, —C(O)— and/or a polydiorganosiloxane unit with 2 to 100 silicon atoms, $ST^2$=straight-chained or cyclic or branched, saturated or unsaturated or aromatic hydrocarbon residue with 2 to 100 carbon atoms, which may contain —O—, —C(O)—, —NH—, —$NR^3$—, and optionally a polydiorganosiloxane unit with 2 to 100 silicon atoms, wherein
  $R^3$=straight-chained or cyclic or branched, saturated or unsaturated or aromatic hydrocarbon residue with up to 7 carbon atoms, which may contain —O—, —C(O)— and —NH—, $ST^3$=a divalent, straight-chained hydrocarbon residue with up to 10 carbon atoms, which contains one or more groups selected from —O— and —C(O)—, $Y=-NR^6-$, wherein
  $R^6$=hydrogen or a straight-chained, cyclic or branched, saturated, unsaturated or aromatic hydrocarbon residue- with up to 7 carbon atoms, which may contain one or more groups selected from —O—, —C(O)—, —NH— and —NR$^3$—, wherein R$^3$ is defined as above, and R$^5$=straight-chained or cyclic or branched, saturated or unsaturated or aromatic hydrocarbon residue with up to 6 carbon atoms, which may contain —O—, —C(O)—, —NH—, or two of the residues R$^5$ form a C2- to C3-alkylene residue, or one or more of the residues R$^5$ form a bond to the residue ST$^2$ while forming cyclic structures, A$^-$=inorganic anion, such as halogenide, especially chloride, organic anion, such as carboxylate, in particular C2- to C18-carboxylate, alkylpolyether carboxylate, alkyl sulfate, especially methosulfate, sulfonate, especially alkyl sulfonate and alkylaryl sulfonate, in particular toluoyl sulfonate.

The case in which two of the residues R$^5$ form an alkylene residue in principle includes 2 possibilities:

Two residues R$^5$ located on the same nitrogen atom can form a ring. Such structures are produced, for example, when cyclic amino compounds are used, such as piperidine, pyrrolidine, 1-H-pyrrole, pyrroline, etc. From piperidine, for example, a compound of the formula

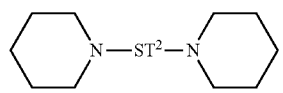

can be prepared (for example by reacting a diepoxide with piperidine), which is then quaternizingly reacted with (5)

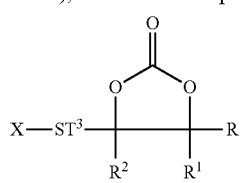

and then reacted with compounds of the formula (2)

(2)

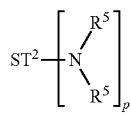

whereby compounds of the formula (1a)

(1a)

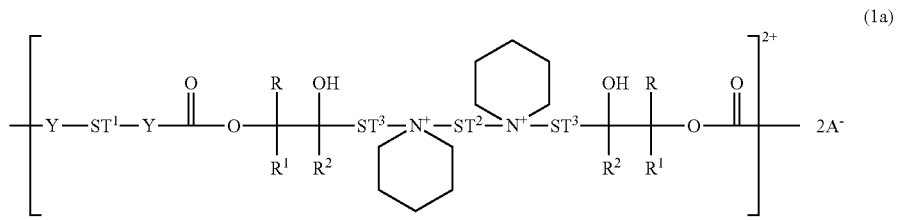

are produced.

Moreover, two residues R$^5$ located on adjacent nitrogen atoms can form a ring. Such structures arise, for example, if dimethyl piperazine is used as the compound of the formula (2)

(2)

(p=2, two R$^5$ form ethylene, two R$^5$ are methyl). Compounds of the formula (1b), for example, are produced:

(1b)

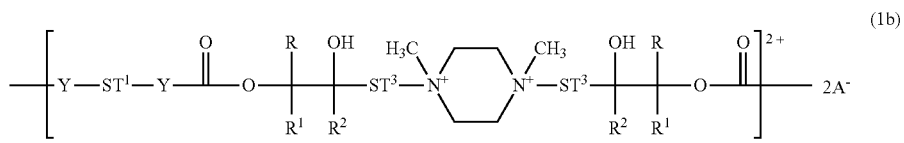

The case in which one or more of the residues R$^5$ form a bond to the residue ST$^2$ while forming cyclic structures, corresponds to the following situation, for example. By using, for example, methyl piperazine, compounds of the formula (6)

(6)

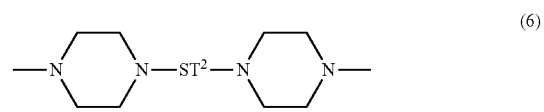

are produced (for example by the reaction of a diepoxide with methyl piperazine), which are then quaternizingly reacted, so that compounds of the structures (1c), for example, result:

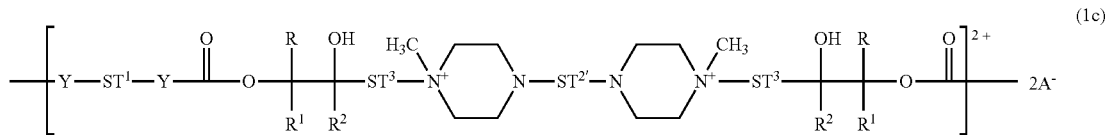
(1c)

In a further step, these compounds can additionally be quaternized on the nitrogen atoms by reaction with, for example, compounds of the formula (7)

$$X'-R^3 \quad (7),$$

wherein X' is a leaving group as defined for X, and $R^3$ is defined as above, so that compounds of the formula (1d)

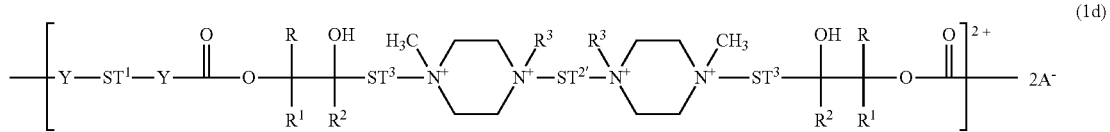
(1d)

result, which formula additionally serves as an illustration of compounds that contain in $ST^2$ structural elements of the formula

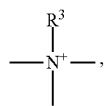

i.e., this group substantially serves the formation of cyclic structures within $ST^2$.

In particular, the structural elements $ST^1$ are derived from hydrocarbon-based or siloxane-based di-primary or secondary amines or alcohols. Di-primary amino structures are preferred.

The hydrocarbon-based residues $ST^1$ are structures which, on the one hand, are derived directly from di-primary and secondary amines or alcohols.

Particularly preferred, in the case of difunctional structures, are divalent, straight-chained hydrocarbon residues with up to 15 carbon atoms, for example hexamethylene, divalent, cyclic hydrocarbon residues with up to 15 carbon atoms, for example based on bis-cyclohexylmethane structures

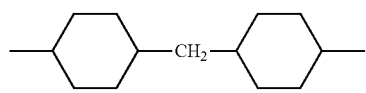

or piperazine or commercially available bis-secondary amines, such as Jefflink® 754 (Huntsman Corp.)

divalent, branched hydrocarbon residues with up to 15 carbon atoms, for example based on methylcyclohexyl or isophorone structures

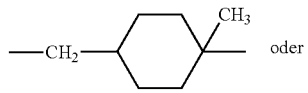
oder

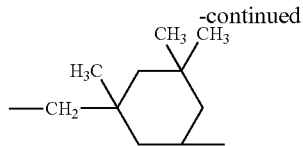
-continued divalent, aromatic hydrocarbon residues with up to 15 carbon atoms, for example based on 2,4-toluoyl, 2,6-toluoyl, bis-phenyl-methane and naphthylene structures

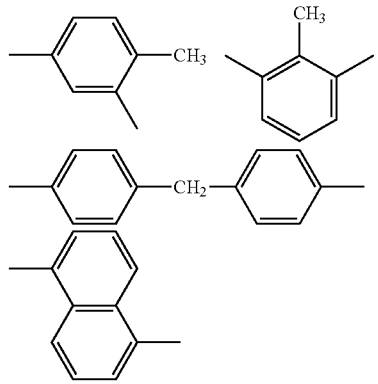

ethylendiamine and its oligomers, 1,3-propylenediamine and its oligomers, $H_2NCH_2CH_2N(CH_3)CH_2CH_2NH_2$, $H_2NCH_2CH_2CH_2N(CH_3)CH_2CH_2CH_2NH_2$ as well as $HOCH_2CH_2N(CH_3)CH_2CH_2OH$ and $HOCH_2CH_2NH_2$ and their oligomeric ethyleneoxide derivatives.

In another preferred embodiment, the hydrocarbon residues $ST^1$ are more complex structures derived from primary and secondary amino-functionalized prepolymers, which may also be higher-functionalized.

Examples include primary or secondary amino-terminated polyethers, preferably ethyleneoxide- and propyleneoxide-based polyethers, for example primary and secondary amino-terminated polyethers of the type Jeffamine®, for example from the ED and T-series (Huntsman Corp.).

NH$_2$-terminated polyamides,
NH$_2$-terminated ureas.

The introduction according to the invention of siloxane blocks into ST$^1$ preferably takes place via α,ω-primary or secondary amino-functionalized prepolymers.

The production of the corresponding α,ω-primary or secondary aminoalkyl-terminated siloxanes is part of the prior art (Silicone, Chemie and Technologie, Vulkan Verlag Essen 1989, pp. 85-90).

The α,ω-positioned amino terminal groups are, for example
—CH$_2$CH$_2$CH$_2$NH$_2$, —CH$_2$CH$_2$CH$_2$NHCH$_2$CH$_2$NH$_2$,
—CH$_2$NH$_2$, —CH$_2$NHCH$_2$CH$_2$NH$_2$,
—CH$_2$CH$_2$CH$_2$OCH$_2$CH(OH)CH$_2$NH$_2$
—CH$_2$CH$_2$CH$_2$OCH$_2$CH(OH)CH$_2$NHCH$_2$CH$_2$NH$_2$
or the analogous ring-opening products of cyclohexaneoxide with ammonia and ethylenediamine.

The siloxane unit preferably has the structure (4)

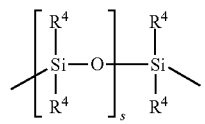

with
R$^4$ C1 to C20, preferably C1 to C9, straight-chained or cyclic or branched, saturated or unsaturated or aromatic hydrocarbon residue, particularly preferably methyl and phenyl and
s 1 to 999, preferably 1 to 199, in particular 1 to 99.

In a particularly preferred case, the siloxane unit has the structure (4a)

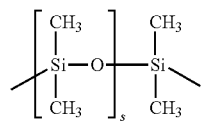

(4a)

wherein s is as specified above.

As was already mentioned, it lies within the scope of the invention to use alkoxyaminosiloxanes, such as

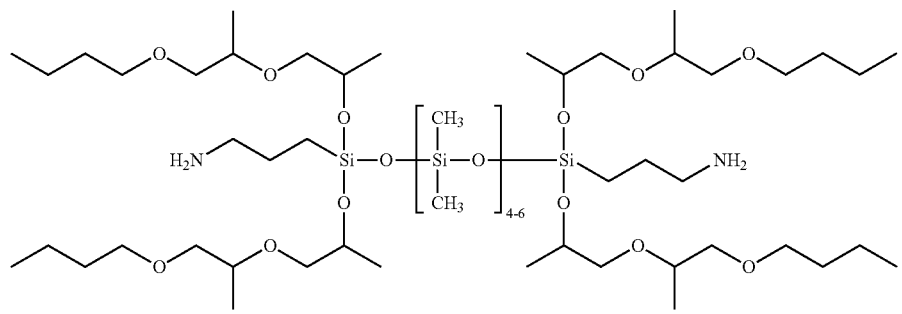

This offers the possibility of specifically also introducing reactive silicon-alkoxy structures into ST$^1$.

Furthermore, it lies within the scope of the invention to oligomerize in advance the hydrocarbon-based and siloxane-based ST$^1$ precursors containing primary and secondary amino terminal groups. To this end, they are preferably made to react, in a preceding reaction, with a stoichiometric deficit and diepoxides. Following this method, aminosiloxanes can be combined, for example, with alkoxyaminosiloxanes, or aminosiloxanes with aminopolyethers, or aromatic hydrocarbyl amines with alkoxyaminosiloxanes in ST$^1$.

Moreover, it lies within the scope of the invention to use higher-functional primary and secondary amines and alcohols for forming a hydrocarbon residue ST$^1$. Examples include N(CH$_2$CH$_2$NH$_2$)$_3$, N(CH$_2$CH$_2$OH)$_3$. Branched structures are generated therefrom. Moreover, it lies within the scope of the invention to use siloxane prepolymers carrying higher-functional primary or secondary amino groups for forming the hydrocarbon residue ST$^1$.

These comb-like and optionally α,ω-amino-functionalized siloxanes are also known from the prior art and preferably comprise amino groups of the types
—CH$_2$CH$_2$CH$_2$NH$_2$, —CH$_2$CH$_2$CH$_2$NHCH$_2$CH$_2$NH$_2$,
—CH$_2$NH$_2$, —CH$_2$NHCH$_2$CH$_2$NH$_2$,
—CH$_2$CH$_2$CH$_2$OCH$_2$CH(OH)CH$_2$NH$_2$
—CH$_2$CH$_2$CH$_2$OCH$_2$CH(OH)CH$_2$NHCH$_2$CH$_2$NH$_2$
or the analogous ring-opening products of cyclohexaneoxide with ammonia and ethylenediamine.

It also lies within the scope of the invention to use mono-functional primary and secondary amines and alcohols for forming a hydrocarbon residue ST$^1$. Examples for this include C1- to C18 fatty amines, mono-functional polyethers, e.g. Jeffamines of the M-type, (CH$_3$)$_2$NCH$_2$CH$_2$OH.

Moreover, it lies within the scope of the invention to use siloxane prepolymers carrying mono-functional primary or secondary amino groups for forming the hydrocarbon residue ST$^1$. Examples include MM*- and M$_2$D* structures comprising substituents of the types
—CH$_2$CH$_2$CH$_2$NH$_2$, —CH$_2$CH$_2$CH$_2$NHCH$_2$CH$_2$NH$_2$,
—CH$_2$NH$_2$, —CH$_2$NHCH$_2$CH$_2$NH$_2$,
—CH$_2$CH$_2$CH$_2$OCH$_2$CH(OH)CH$_2$NH$_2$
—CH$_2$CH$_2$CH$_2$OCH$_2$CH(OH)CH$_2$NHCH$_2$CH$_2$NH$_2$ The starting compounds introducing the group ST$^2$ are non-siloxane-containing, e.g. optionally substituted or hetero atoms-containing hydrocarbon- or siloxane-based materials.

In a preferred embodiment, they are di-tertiary hydrocarbon-based substances.

In particular, they may be aliphatic or aromatic di-tertiary amines, for example (CH$_3$)$_2$N(CH$_2$)$_2$N(CH$_3$)$_2$, (CH$_3$)$_2$N(CH$_2$)$_4$N(CH$_3$)$_2$, (CH$_3$)$_2$N(CH$_2$)$_6$N(CH$_3$)$_2$, and ether-containing, di-tertiary amines, for example (CH$_3$)$_2$N(CH$_2$)$_3$O(CH$_2$)$_3$N(CH$_3$)$_2$ and (CH$_3$)$_2$N(CH$_2$)$_2$O(CH$_2$)$_2$N(CH$_3$)$_2$.

In another embodiment, the hydrocarbon-based di-tertiary amines are derived from epoxy, halogen, halocarboxylic acid precursors which are transferred into the di-tertiary amines by means of secondary amines.

Preferably, the hydrocarbon-based diepoxide derivatives are
   hydrocarbon diepoxides, e.g. vinylcyclohexenediepoxide
   epoxy-terminated polyethers, preferably ethyleneoxide- and propyleneoxide-based polyethers, for example glycidyl-terminated polyethers
   epoxy-terminated polyesters,
   epoxy-terminated polycarbonates The halogen-functionalized hydrocarbon derivatives, preferably chlorides and bromides, preferably are
   hydrocarbon dihalides
   halogen-terminated, preferably ethyleneoxide- and propyleneoxide-based polyethers
   Halocarboxylic acid esters of hydrocarbon diols and polyethers, preferably ethyleneoxide- and propyleneoxide-based polyethers, especially chloroacetic acid esters, chloropropionic acid esters and chlorobutanoic acid esters of hydrocarbon diols and polyethers.

It also lies within the scope of the invention to transfer difunctional acid alkoxylates into corresponding glycidyl, halogen or halocarboxylic acid esters derivatives and use them according to the invention. They are derived, for example, from succinic acid.

The synthesis of the particularly preferred chlorocarboxylic acids is carried out in the known manner (Organikum, Organisch-Chemisches Grundpraktikum, 17. edition, VEB Deutscher Verlag der Wissenschaften, Berlin 1988, pp. 402-408) by reaction of the diol component with the corresponding halocarboxylic acid anhydrides or halocarboxylic acid chlorides.

In another embodiment, the precursors for the hydrocarbon residues $ST^2$ are more complex α,ω-epoxy- or halogen-terminated structures derived from α,ω-hydroxyl-functionalized prepolymers.

Preferably, these α,ω-hydroxyl-functionalized prepolymers are the reaction products of
   diols with diisocyanates
   OH-terminated polyethers, preferably ethyleneoxide- and propyleneoxide-based polyethers with diisocyanates,
   OH-terminated polyesters,
   OH-terminated polycarbonates.

In a preferred embodiment, these α,ω-hydroxyl-functionalized prepolymers are transferred into the corresponding α,ω-halocarboxylic acid esters, especially chloroacetic acid esters, chloropropionic acid esters and chlorobutanoic acid esters.

The introduction of siloxane blocks into $ST^2$ according to the invention, which is also preferred, on the one hand takes place via α,ω-tertiary-aminoalkyl-terminated siloxanes, for example N,N-dimethylaminopropyl-terminated and N,N-dimethylaminomethyl-terminated siloxanes. The synthesis of such α,ω-tertiary-aminoalkyl-terminated siloxanes is carried out, for example, in a known manner by hydrosilylation of unsaturated tertiary amines with corresponding SiH siloxanes in the presence of Pt catalysts, or starting from chloromethylhydrogensilanes.

In another embodiment, the siloxane-based di-tertiary amines are derived from epoxy, halogen, halocarboxylic acid precursors which are transferred into the di-tertiary amines by means of secondary amines.

Preferably, the epoxy, halogen, halocarboxylic acid precursors are
   α,ω-epoxy-terminated siloxanes, preferably α,ω-glycidyl- and epoxycyclo-hexyl-terminated siloxanes,
   α,ω-halogenalkyl-terminated siloxanes, preferably chloromethyl-, chloropropyl- and chloropropenyl-terminated siloxanes
   α,ω-halocarboxylic-acid-ester-terminated siloxanes, preferably esters of chloroacetic acid, chloropropionic acid and chlorobutanoic acid,
   α,ω-halocarboxylic-acid-ester-terminated polyethersiloxanes, preferably esters of chloroacetic acid, chloropropionic acid and chlorobutanoic acid.

The preparation of these α,ω-epoxy-terminated siloxanes and α,ω-halogenalkyl-terminated siloxanes introduced into $ST^2$ is described in the prior art (Silicone, Chemie and Technologie, Vulkan Verlag Essen 1989, pp. 85-90 and 120).

The preparation of α,ω-halocarboxylic-acid-ester-terminated siloxanes can be carried out in analogy to the process according to WO 02/10256, Example 1. In this case, SiH siloxanes are reacted with halocarboxylic acid esters of olefinically or acetylenically unsaturated alcohols.

The preparation of α,ω-halocarboxylic-acid-ester-terminated polyethersiloxanes can be carried out in analogy to WO 02/10257, Example 1. In this case, SiH siloxanes are reacted with halocarboxylic acid esters of olefinically or acetylenically unsaturated polyethers. Alternatively, it is possible to react polyethersiloxanes with halocarboxylic acids, their anhydrides or acid chlorides (U.S. Pat. No. 5,153,294, U.S. Pat. No. 5,166,297).

In another embodiment, the introduction of siloxane blocks into $ST^2$ is carried out via α,ω-epoxy- or halogen-functionalized siloxane prepolymers, which can preferably be obtained from the corresponding α,ω-hydroxyalkyl or α,ω-hydroxypolyether-terminated siloxane prepolymers.

These OH-terminated siloxane-containing prepolymers are preferably obtained by reaction of
   α,ω-hydroxyalkyl-terminated siloxanes with diisocyanates,
   α,ω-polyether-terminated siloxanes with diisocyanates,
and then transferred into the epoxy and halogen derivatives. The α,ω-halocarboxylic-acid-functionalized siloxane prepolymers, which are available by esterification with, for example, the anhydrides or acid chlorides, constitute a preferred embodiment. Furthermore, it lies within the scope of the invention to oligomerize in advance suitable hydrocarbon-based and siloxane-based $ST^2$ precursors.

For this purpose, diepoxides are being made to react, in a preferred embodiment, with a stoichiometric deficit of di-secondary amines, e.g. piperazine, and then, the remaining terminal epoxy groups are alkylated with secondary amines or secondary-tertiary diamines. Examples for these amines include dimethylamine, N-methylpiperazine and CH$_3$NHCH$_2$CH$_2$CH$_2$Si[OCH(CH$_3$)$_2$]$_3$.

In another preferred embodiment, diepoxides are being made to react with a stoichiometric deficit of primary-aminoalkyl-substituted silanes, for example H$_2$NCH$_2$CH$_2$CH$_2$Si[OCH(CH$_3$)$_2$]$_3$ while extending the chain and then, the remaining terminal epoxy groups are alkylated with secondary amines or secondary-tertiary diamines. Examples for these amines include dimethylamine, N-methylpiperazine and CH$_3$NHCH$_2$CH$_2$CH$_2$Si[OCH(CH$_3$)$_2$]$_3$.

Following the method of the oligomerization reactions described above, hydrocarbon-, polyether-, siloxane- and silane-based structures can be combined with one another in $ST^2$.

Moreover, it lies within the scope of the invention to use higher-functional hydrocarbon-based or siloxane-based substances for forming the residue $ST^2$. These materials contain more than two of the tertiary amino functions treated above. One example is N[CH$_2$CH$_2$CH$_2$N(CH$_3$)$_2$]$_3$ Furthermore, these higher-functional tertiary amines can be generated from corresponding epoxy, halogen or halocarboxylic acid derivatives by the reaction with secondary amines described above.

Examples for higher-functional hydrocarbon-based substances include the glycidyl or chloroacetic acid ester derivatives of glycerol, pentaerythrol, sorbitol and of their ethoxylates/propoxylates. It also lies within the scope of the invention to transfer higher-functional acid alkoxylates into corresponding glycidyl or chloroacetic acid ester derivatives and use them according to the invention. They are derived, for example, from trimellitic acid or pyromellitic acid.

Suitable higher-functional siloxane-based substances can be obtained, for example, by hydrosilylation of SiH siloxanes on unsaturated tertiary amines in the presence of Pt catalysts, or starting from chloromethylsilanes.

Furthermore, suitable higher-functional siloxane-based substances can be obtained from α,ω- and/or comb-like epoxy- or halogen, preferably halocarboxylic-acid-ester-substituted siloxanes by reaction with secondary amines.

What is important is that the functionality of these higher-functional hydrocarbon-based or siloxane-based substances is greater than 2.

Moreover, it lies within the scope of the invention to use monofunctional hydrocarbon-based or siloxane-based substances for forming the residue $ST^2$. These materials contain one of the tertiary amino groups treated above.

Examples for monofunctional hydrocarbon-based substances include fatty acid amides based on $(CH_3)_2NCH_2CH_2CH_2NH_2$ and $(CH_3)_3SiOSi(CH_3)_2$—$CH_2CH_2CH_2N(CH_3)_2$.

If epoxy-containing precursors are used for introducing $ST^2$, acid is added in stoichiometric amounts in the manner known from the prior art. The anions are inorganic anions, such as halogenide, especially chloride, and organic anions, such as carboxylate, especially C2 to C18-carboxylate, alkylpolyethercarboxylate, alkylsulfate, especially methosulfate, sulfonate, especially alkylsulfonate and alkylarylsulfonate, in particular tolylsulfonate.

Based on the explanations above with respect to $ST^1$ and $ST^2$, it becomes clear that the non-siloxane-based, such as hydrocarbon- and siloxane-based elements $ST^1$ and $ST^2$ can be mixed with one another within wide limits in the compounds according to the invention. In addition, reactive alkoxysiloxanes and alkoxysilanes can be introduced.

As was already shown, the use of higher-functional and monofunctional $ST^1$ and $ST^2$ precursors permits a specific deviation from the linear polymer structure. Essentially, these monofunctional non-siloxane-based, such as hydrocarbon- or siloxane-based $ST^1$ and $ST^2$ precursors are added in order to regulate the molecular weight of the polymers formed. The higher-functional $ST^1$ and $ST^2$ precursors serve for controlling the degree of branching of the polymer chains.

The compounds according to the invention are preferably prepared according to a method comprising the step of reacting a compound of the formula (5)

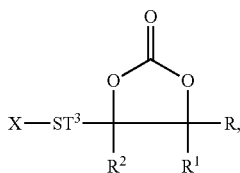

(5)

wherein R, $R^1$, $R^2$ and $ST^3$ are as defined above, and X is a leaving group, with a compound of the formula (2):

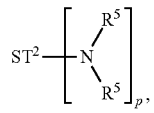

wherein $ST^2$ and $R^5$ are defined as above, and p=2 or 3, and simultaneously or subsequently the reaction with a compound of the formula (3)

wherein $ST^1$ is defined as above, and q=2 to 10.

Preferably in this case, $Y=NR^6$ wherein $R^6$ is as defined above; particularly preferably, Y is hydrogen. X preferably is halogen. Generally, it forms the anion A– after the quaternization reaction.

The block copolymers according to the invention containing quaternary ammonium groups and siloxane units are preferably prepared by means of a method comprising the reaction of a compound of the formula (8)

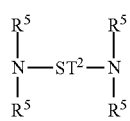

(8)

wherein $ST^2$ and $R^5$ are as defined above, with a compound of the formula (9):

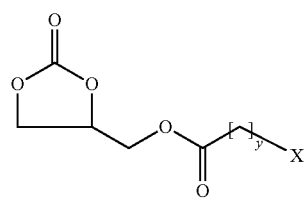

(9)

wherein y=1 to 19 and X are defined as above. These difunctional carbonate precursors can, for example, be synthesized from glycerol carbonate and halocarboxylic acids or their acid chlorides. Chloroacetic acid, chloropropane acid and chlorobutanoic acid are preferred representatives.

The intermediate product (10) formed

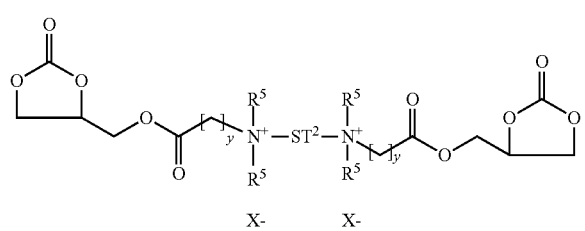

(10)

is then reacted with a compound of the formula (11)

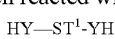

(11)

wherein $ST^1$ and Y are defined as above.

The reactions of

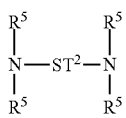
(8)

with the difunctional carbonate precursors and subsequently, the $ST^1$ precursors are preferably carried out in the range of from room temperature to 160° C., preferably to 140° C. The reaction times are a few minutes to some hours. Reaction times, reaction temperatures and the conversion achieved are particularly dependent on the structure of the precursors. Chloroacetic acid-based carbonate precursors are generally more reactive than longer-chained derivatives with a greater y. In turn, primary-amine-terminated $ST^1$ precursors are generally more reactive than secondary-amine-terminated or OH-terminated $ST^1$ precursors.

It lies within the scope of the invention to carry out the entire reaction sequence or individual partial steps without any solvents or, however, in the presence of solvents. Preferred solvents are typical lacquer solvents, such as methoxypropylacetate, butyl acetate, toluene. The reaction in protic solvents, such as alcohols, for example ethanol, 2-propanol, 1-butanol, 2-butanol, 1-methoxy-2-propanol or higher ethyleneoxide- or propyleneoxide derivatives may also be advantageous.

Furthermore, the invention relates to reactive compositions suitable for forming the compounds according to the invention, comprising at least one compound of the formula (5)

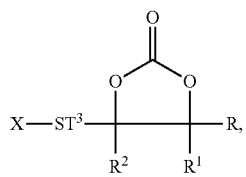
(5)

wherein R, $R^1$, $R^2$ and $ST^3$ are as defined above, and X is a leaving group, at least one compound of the formula (2):

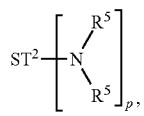
(5)

wherein $ST^2$ and $R^5$ are defined as above, and p=2 or 3, and at least one compound of the formula (3)

wherein $ST^1$ is defined as above, and q=2 to 10.

In the reactive composition, Y is preferably $NR^6$, wherein $R^6$ is as defined above, preferably hydrogen.

The reactive compositions can be formulated as single-component or multi-component systems, in particular as two-component systems. In this connection, it is possible to optionally add other reactive components, such as polyisocyanates, in particular for subsequent cross-linking or chain-extension, to the reactive compositions, as was already mentioned above.

The invention further relates to cured compositions, obtainable by curing the aforementioned reactive compositions. Curing of the reactive compositions is carried out, in particular, in order to prepare coatings on substrates, such as fibers, hard surfaces, such as on plastics, metal etc. Curing can take place at temperatures of from room temperature (20° C.) to about 250° C. It is also possible to prepare thermoplastic, elastomeric or duroplastic molded articles or sealants in this manner.

Preferably, the compounds according to the invention, such as, in particular, the block copolymers containing quaternary ammonium groups and, preferably, siloxane units, can be used in the treatment and finishing of hard surfaces, such as glass, ceramics, tiles, plastic surfaces, metal surfaces, lacquer surfaces, especially ship's hulls and automobile bodies, in particular also in drying agent formulations for automatic car washing, as an adhesive or primer, preferably for the bonding of silicone elastomers to other substances, such as steel, aluminum, glass, epoxy resin, polyamide, as modifiers, e.g. low-temperature impact-resistance modifiers and polarity modifiers, for hydrocarbon-based polymers and silicone-based elastomer systems based on peroxidic and Pt-catalyzed cross-linking.

Moreover, the polycarbonate-polyorganosiloxane and/or polyurethane-polyorganosiloxane compounds can preferably be used as a constituent in adhesives and sealants, as the basic material for thermoplastic elastomers, such as cable sheathings (cable coatings), tubes, gaskets, keyboard mats, for membranes, such as selectively gas-permeable membranes. Another use of the copolymers according to the invention are coatings, such as anti-fouling, anti-stick coatings, tissue-compatible coatings, flame-retardant coatings and bio-compatible materials.

They can serve as coating agents for cosmetics, body care products, paint additives, auxiliary substances in detergents, de-foaming formulations and textile processing, for modifying resins or modifying bitumen.

Other uses include packaging material for electronic components, insulation or shielding materials, sealing material in cavities with formation of condensation water, such as air planes, ships, automobiles, additives for cleaning agents, detergents or care products, as an additive for body care products, as coating material for wood, paper and cardboard, as mold-release agent, as a bio-compatible material in medical applications such as contact lenses, as coating material for textile fibers or textile fabrics, as coating material for natural fabrics such as, for example, leather or furs, as material for membranes and as a material for photoactive systems, e.g. for lithographic processes, optical data recording or optical data transmission.

In a further preferred embodiment of the invention, this relates to the use of the polycarbonate-polyorganosiloxane and/or polyurethane-polyorganosiloxane compounds according to the invention for the production of viscosity regulators, anti-static agents, mixture components for silicone rubbers that can be cross-linked peroxidically or by hydrosilylation (platinum catalysis) to form elastomers, and there lead to the modification of surface properties, for the modification of the diffusion of gases, liquids, etc, or modify the swelling behavior of the silicone elastomers, of softeners for textile fibers for the treatment of textile fibers prior to, during and after washing, of agents for modifying natural and synthetic fibers, such as hair, cotton fibers and synthetic fibers, such as polyester fibers and polyamide fibers, as well as union fabric, of textile finishing agents, as well as of detergent-containing formulations, such as laundry detergents and cleaning products.

The present invention further relates to novel laundry detergent formulations, cosmetic formulations, fiber treatment formulations containing the polycarbonate-polyorganosiloxane and/or polyurethane-polyorganosiloxane compounds according to the invention.

Moreover, they can be used for the treatment of natural and synthetic fibers, such as cotton, wool, polyester- and polyamide-based synthetic fibers, especially in the form of textiles, in specific agents for fiber treatment, in particular in laundry detergent formulations containing anionic, non-ionic and cationic surfactants, wherein the compounds according to the invention can be directly incorporated into the laundry detergent, can be added in a dosed manner separately to the running washing process or subsequent to the washing process, and wherein the treated substrates are given a softness typical for silicone, improved elasticity and a decreased tendency to crease while receiving acceptable hydrophilicity.

They can also serve as a constituent of separate softening systems, especially on the basis of cationic surfactants, after washing fibers and textiles, as an ironing aid and agent for preventing or reversing textile creasing.

They can further be used for finishing fibers, especially for the first finishing and treatment of, for example, cotton, wool, polyester- and polyamide-based synthetic fibers, especially in the form of textiles, paper and wood.

Moreover, they can be used advantageously in cosmetic systems for the treatment of hair and skin.

Preferred application areas of the compounds according to the invention are, for example, solutions, mixtures, emulsions and micro-emulsions as basis for cosmetic formulations.

The compounds described above can be used as a pure substance, solution, mixture, emulsion or micro-emulsion, in the form of liquids, creams or pastes as feedstock for the production of suitable cosmetic formulations according to the invention having different viscosities. In order to distinguish them from the silicone conditioners of the category 2 defined below, which according to the prior art are known by themselves or as co-adjuvants, the compounds according to the invention will hereinafter referred to as silicones of category 1.

The method for preparing formulations for the treatment of substrates comprises, for example, the steps a) Producing a pre-mixture in the form of solutions, mixtures or emulsions from the compounds according to the invention, and
b) Producing another mixture using the pre-mixture a) as well as adding of, optionally, further surfactants, auxiliary substances and other additives, or combining the steps a) and b) by mixing the constituents with stirrers, dissolvers, kneaders, pumps, mixing screws, mixing nozzles, low- and high-pressure emulsifying devices.

The processes are realized using the machines and apparatuses known in the art (Ullmann's Enzyklopadie), such as, for example, any form of stirrers in suitable containers, apparatuses or mixing devices, as described above.

Direct mixing of all constituents is possible.

However, the preparation of a pre-mixture is preferred since it leads to a faster and better distribution and is, in part, indispensable because the various substance groups can otherwise not be suitably mixed with each other or emulsified or dispersed, or only with considerable effort. Suitable pre- or intermediate mixtures can preferably be mixtures in the form of solutions, pastes, creams or other forms of emulsions or dispersions. Particularly preferred is the production and use of micro-emulsions with 10 to 200 nm mean particle diameter in cosmetic formulations. The formulations according to the invention can, for example, be produced as different form of administration, such as for hair treatment. Preferably, the compositions containing the polysiloxane compounds according to the invention are used as cosmetic formulations for the treatment of keratin-containing substrates, such as, for example, human and animal hair or skin, as alcoholic or polyalcoholic solution or as emulsion. Depending on the raw materials, auxiliary substances and the mixing method used during the production, clear, opaque and white formulations are obtained.

Compositions of the Solutions, Pre-Mixtures and Mixtures

For preparing solutions and mixtures according to the invention, alcoholic and polyalcoholic solvents as well as their mixtures with water, oil-containing and common silicones (inter alia polydimethylsiloxane) as well as binary and ternary mixtures of solvents and/or oil-containing substances and/or silicones are preferably suitable. In this case, particularly preferred solvents are ethanol, isopropanol, ethylene glycol and ethylene glycol ether, polyethylene glycols and their ethers, propylene glycol and propylene glycol ethers, polypropylene glycol and their ethers and glycerin and mixtures thereof. Particularly preferred oil-like substances include mineral oil products as well as oils of plant, animal and synthetic origin and mixtures thereof. Particularly preferred silicones include cyclic and linear polydimethylsiloxanes and mixtures thereof, such as, for example, (according to INCI) cyclomethicones, cyclotetrasiloxanes, cyclopentasiloxanes, cyclohexasiloxanes, dimethicones with a viscosity range of 0.65 to 60,000,000 mPa·s at 25° C. and dimethiconol with a viscosity range of 10 to 60,000,000 mPa·s at 25° C. that do not fall under the definition of the compounds according to the invention (see the following definition).

Preferred solutions and mixtures have the following composition in % by wt.:

Solutions or Mixtures:

| | |
|---|---|
| 0.1-99.9% | polycarbonate-polyorganosiloxane and/or polyurethane-polyorganosiloxane compounds according to the invention |
| 0.1-99.9% | solvents and/or oil and/or silicones, and/or water |

Compositions of the Emulsions of the Polycarbonate-Polyorganosiloxane and/or Polyurethane-Polyorganosiloxane Compounds According to the Invention:

For preparing the emulsions, water and non-ionic, cationic and amphoteric surfactants and surfactant mixtures are generally used. Furthermore, emulsions may contain auxiliary substances, such as, for example, inorganic and organic acids, bases and buffers, salts, thickening agents, stabilizers for emulsions, such as, for example, "xanthan gum", preserving agents, foam stabilizers, de-foaming agents and solvents, such as, for example, alcohols (ethanol, isopropanol, ethylene glycol, polyethylene glycol, propylene glycol, polypropylene glycol, glycol ether and glycerin and mixtures thereof).

The polycarbonate-polyorganosiloxane and/or polyurethane-polyorganosiloxane compounds according to the invention used in the emulsions may themselves also serves as emulsifiers in the preparation of emulsions.

A preferred emulsion that can preferably be used for the production of cosmetic formulations, consists, for example, of the following constituents in % by wt., relative to the total amount of the composition:

| | |
|---|---|
| 10-50% | polycarbonate-polyorganosiloxane- and/or polyurethane-polyorganosiloxane compounds according to the invention, |
| 1-35% | surfactants, |
| 0-10% | auxiliary substances, |
| 0-20% | solvents, |
| to 100% | supplemented with water. |

Micro-Emulsions for Cosmetic Formulations, the Finishing of Textiles and Other Fiber-Like Substrates, or the Coating of Hard Surfaces:

The preparation of micro-emulsions with a high active content of polycarbonate-polyorganosiloxane and/or polyurethane-polyorganosiloxane compounds according to the invention is particular preferred, since they, in addition to the possibility of preparing clear cosmetic formulations, offer the additional advantage of being simple, with regard to the process, to work into ("cold process") aqueous formulations. There is the possibility of using the polycarbonate-polyorganosiloxane and/or polyurethane-polyorganosiloxane compounds according to the invention in the preparation of micro-emulsions in the form of the above described solutions and mixtures. A preferred active content of the polycarbonate-polyorganosiloxane and/or polyurethane-polyorganosiloxane compounds according to the invention in the emulsion is between 5 and 60% by wt., particularly preferably 10-50% by wt., relative to the total amount of the composition.

An especially preferred micro-emulsion consists of the following constituents, which, however, do not limit the invention, in % by wt. relative to the total amount of the micro-emulsion.

| | |
|---|---|
| 20-80% | Polycarbonate-polyorganosiloxane and/or polyurethane-polyorganosiloxane compounds according to the invention |
| 0-35% | Surfactants |
| 0-10% | Auxiliary substances |
| 0-20% | Solvents |
| to 100% | supplemented with water. |

Another subject matter of the invention is the use of the solutions, mixtures or emulsions prepared with the polycarbonate-polyorganosiloxane and/or polyurethane-polyorganosiloxane compounds according to the invention in a cosmetic formulation.

These cosmetic formulations are prepared using the previously prepared solutions or emulsions; however, they can also be prepared directly from the individual constituents.

Cosmetic Formulations:

Cosmetic formulations include, for example:

So-called "rinse-off" products, such as, for example, "2-in-1" shampoos, "body wash" and hair conditioner for treating hair during and after washing or after dyeing or the treatment of hair prior to bleaching, curling or uncurling, as well as so-called "leave-in" products, such as hair tonics, care creams, styling creams, hair gels, hair styling products, hair setting products, hair sprays, pump sprays, blow-waving compositions and blow-drying setting compositions. The formulations moreover also include hair dyes, which can be differentiated into 3 types according to the resistance of the color result achieved to washing—permanent, semipermanent and temporary hair dyes. The term hair in this case includes all keratin-containing fibres, but in particular human hair. The hair dyes contain, for example, conventional silicones, surfactants, auxiliary substances and dyes, in addition to the polycarbonate-polyorganosiloxane and/or polyurethane-polyorganosiloxane compounds according to the invention. Each of these ingredients can be used either by itself or in combination with further ingredients, and represents additional functions in the formulations which serve to increase the volume, the ease of combing and the gloss and to reduce washing out of the color from and out of dyed keratin-containing substrates, such as, for example human and animal hair, and contain at least one polyurethane and polyester-polysiloxane compound according to the invention.

The abbreviations mentioned in connection with the cosmetic formulations are explained in the INCI (The Cosmetic, Toiletry and Fragrance Association, Washington D.C.).

The silicones included here in addition to the polycarbonate-polyorganosiloxane and/or polyurethane-polyorganosiloxane compounds according to the invention include, for example:

Cyclic, linear and branched polydimethylsiloxanes having a viscosity of 0.65-200,000,000 mPa·s at 25° C. and mixtures thereof, such as e.g. octaorganocyclotetrasiloxanes, octamethylcyclotetrasiloxanes, decaorganocyclopentasiloxanes and dodecaorganocyclohexasiloxanes, wherein the organic residue preferably denotes methyl, such as SF 1173, SF 1202, SF 1217, SF 1204 and SF 1258 from GE Bayer Silicones, dimethicones, such as the Baysilone M oils (M3 to M 2,000, 000), SE 30, SF 1214, SF 1236, SF 1276 and CF 1251 from Momentive Performance Materials, and dimethiconols, such as Baysilone adhesive ZWTR/OH, i.e. SiOH-terminated polydimethylsiloxanes 2-20 kPa·s from Momentive Performance Materials and DC 1501 and DC 1503 from Dow Corning.

The use of the polydimethylsiloxanes described above in the form of non-ionic, anionic and cationic emulsions, such as e.g. SM 2169, SM 2785, SM 555, SM 2167 and SM 2112 from Momentive Performance Materials, in combination with emulsions of the polycarbonate-polyorganosiloxane and/or polyurethane-polyorganosiloxane compounds according to the invention and/or the use of mixtures and solutions of the polydimethylsiloxanes described above with the polycarbonate-polyorganosiloxane and/or polyurethane-polyorganosiloxane compounds according to the invention is particularly preferred in this case, since particular properties of hair care products can be derived from these combinations, such as has already been described extensively in the literature for amino-functional silicones known to date (WO 99/44565, WO 99/44567, WO 99/49836, WO 99/53889, WO 97/12594, U.S. Pat. No. 6,028,031, EP 0811371, WO 98/18443, WO 98/43599 and US 2002/0182161).

Solid silicones, so-called MQ resins, such as e.g. SR 1000 from Momentive Performance Materials, and solutions thereof in solvents, such as the above-mentioned silicones and aliphatic solvents, such as e.g. isododecane, are also suitable.

Organofunctional silicones, such as alkyl-, aryl-, arylalkyl-, phenyl-, fluoroalkyl- and polyether-modified silicones, such as the types SF 1632, SF 1642, SF 1555, Baysilone CF 1301, Baysilone PK 20, FF 157, SF 1188A, SF 1288 and SF 1388 from Momentive Performance Materials, are also suitable.

Surfactants:

Surfactants as ingredients of cosmetic formulations are described in A. Domsch: Die kosmetischen Präparate, Verlag für Chem. Industrie, 4th edition, 1992, in Kosmetikjahrbuch 1995, Verlag für chemische Industrie, 1995, and H. Stache, Tensidtaschenbuch, 2nd edition, Carl Hanser Verlag, 1981.

Anionic Surfactants:

By way of example but without being limited thereto, the following anionic surfactants are suitable as a constituent of the formulations:

Alkyl sulfates, alkyl ether sulfates, alkaryl sulfates, olefinsulfonates, alkylamide ether sulfates, acyl isethionates, acyl glutamates, alkyl ether carboxylates, methyl taurides and taurides, sarcosides, sulfosuccinates, protein-fatty acid condensates, alkyl phosphates and alkyl ether phosphates. The free acids and alkali metal salts and magnesium, ammonium and mono-, di- and triethanolamine salts thereof can be used in this case.

The alkyl and acyl groups typically contain 8-18 C atoms and can be unsaturated. The alkyl ether sulfates, alkylamide ether sulfates, alkyl ether carboxylates and alkyl ether phosphates can contain 1-10 ethylene oxide or propylene oxide units or a combination of ethylene oxide and propylene oxide units.

Amphoteric Surfactants:

By way of example but without being limited thereto, the following amphoteric surfactants are suitable as a constituent of the formulations:

Alkylbetaines, alkylamidobetaines, sulfobetaines, acetates and diacetates, imidazolines, propionates and alkylamine oxides.

The alkyl and acyl groups in this case contain 8-19 C atoms.

Non-Ionic Surfactants:

By way of example but without being limited thereto, the following non-ionic surfactants are suitable as a constituent of the formulations:

Alkyl ethoxylates, aryl ethoxylates, ethoxylated esters, polyglycolamides, polysorbates, glycerol-fatty acid ethoxylates, alkylphenol polyglycol ethers and sugar surfactants, such as e.g. alkyl glycosides.

Cationic Surfactants:

In the case of cationic surfactants, a distinction is made between pure cationic surfactants and cationic polymers.

Pure Cationic Surfactants:

By way of example but without being limited thereto, the following non-ionic surfactants are suitable as a constituent of the formulations:

Monoalkylquats, dialkylquats, trialkylquats, tetraalkylquats, benzylammonium salts, pyridine salts, alkanolammonium salts, imidazoline salts, oxazoline salts, thiazoline salts, salts of amine oxides and sulfone salts, wherein the term "quat" implies the presence at least of one quaternary ammonium group.

Cationic Polymers:

For "2-in-1" shampoos in particular, cationically modified polymers are also used in addition to the pure cationic surfactants. A comprehensive description of these polymers is given in U.S. Pat. No. 5,977,038 and WO 01-41720 A1. Cationic polyacrylamides, cationic protein derivatives, hydroxyalkylcellulose ethers and cationic guar derivatives are preferred in this case. Cationic guar derivatives with the CTFA name guar hydroxypropyltrimonium chloride are particularly preferred. These types are available under the trade names Cosmedia Guar C 261 (Henkel), Diagum P 5070 (Diamalt) and Jaguar C types and Jaguar EXCEL from Rhodia.

Auxiliary Substances:

Auxiliary substances as ingredients in particular of cosmetic formulations are described in: A. Domsch, Die kosmetischen Präparate, Verlag für Chem. Industrie, 4th edition, 1992; and in: Kosmetikjahrbuch 1995, Verlag far Chemische Industrie, 1995.

By way of example but without being limited thereto, the following auxiliary substances are suitable as a constituent of the formulations:

Inorganic and organic acids, bases and buffers, salts, alcohols, such as e.g. ethanol, isopropanol, ethylene glycol, polyethylene glycol, propylene glycol, polypropylene glycol, glycol ethers and glycerol, thickeners, stabilizers for emulsions, such as e.g. xanthan gum, re-oiling agents, preservatives, foam stabilizers, defoamers, pearlescent and opacifying agents, such as e.g. glycol distearates and titanium dioxide, collagen hydrolysate, keratin hydrolysate, silk hydrolysate, antidandruff active compounds, such as e.g. zinc pyrithione, salicylic acid, selenium disulfide, sulfur and tar preparations, polymeric emulsifiers, vitamins, dyestuffs, UV filters, bentonites, perfume oils, fragrances, styling polymers, moisturizers, plant extracts and further natural or nature-identical raw materials.

It is known that by the addition of oil- and water-soluble UV filters (sunscreen compositions) or combinations of UV filters in cosmetic formulations for care and treatment of keratin-containing substrates, such as human and animal hair, the degradation of dyestuffs and therefore the bleaching out and fading of colored keratin-containing substrates by UV radiation can be reduced decisively or even prevented completely.

Ingredients for Hair Dyes:

Dyestuffs and other ingredients of hair dyes are described in: A. Domsch, Die kosmetischen Präparate, Verlag für chem. Industrie, 4th edition, 1992. Dyestuffs are described in: Ordinance on cosmetic agents (Cosmetics Ordinance), Bundesgesetzblatt 1997, part I p. 2412, .sctn.3 and annex 3 and in European Community (EC) Directive, 76/68/EEC, annex IV.

In the following, hair dyes are differentiated into permanent, semipermanent and temporary hair dyes.

Permanent Hair Dyes:

Permanent colorings which are not washed out even by washing the hair several times (more than 10) are formed by chemical reaction between dyestuff precursors under oxidative conditions by hydrogen peroxide. The mixture of the corresponding components determines the color result which can be achieved in this case.

In the case of the precursors, a distinction is made between oxidation bases (developers) and coupling components (modifiers).

Oxidation Bases:

By way of example but without being limited thereto, the following oxidation bases are suitable as a constituent of the formulations:

m- and p-phenylenediamines (diaminobenzenes), N-substituted derivatives and salts thereof, N-substituted derivatives of o-phenylenediamine, o-, m- and p-toluoylenediamines (methyl-diaminobenzenes), N-substituted derivatives and salts thereof, p-amino-diphenylamine and its hydrochloride and sulfate, o-, m- and p-aminophenol and its hydrochloride, 2,4-diaminoisosulfate (4-methoxy-m-phenylenediamine sulfate), o-chloro-p-phenylenediamine sulfate, picramic acid (2,4-dinitro-6-aminophenol) and 2,4-dinitro-1-naphtholsulfonic acid and the sodium salt thereof.

Coupling Components:

By way of example but without being limited thereto, the following coupling components are suitable as a constituent of the formulations:

Hydroquinone (1,4-dihydroxybenzene), resorcinol (1,3-dihydroxybenzene), pyrocatechol (1,2-dihydroxybenzene), α-naphthol (1-hydroxynaphthalene), pyrogallol (1,2,3-trihydroxybenzene) and 2,6-diaminopyridine.

Oxidation bases and coupling components are conventionally incorporated with surfactants into oil-in-water emulsions, but simple solutions or shampoos are also known as formulations. The formulations moreover contain antioxidants, such as e.g. sodium sulfite, sodium dithionite, ascorbic acid or thioglycolic acid, to stabilize the precursors and are adjusted to a pH-value of between 8 and 12 (preferably 9-11) with alkaline substances, such as e.g. ammonia. Surfactants as wetting agents, complexing agents for heavy metals, fragrances for masking the ammonia smell, conditioners for improving the feel of the hair and for protecting the hair and solvents, such as ethanol, ethylene glycol, glycerol or benzyl alcohol, are moreover added.

Permanent hair dyes are typically on offer as 2-component systems comprising the color solution, cream or shampoo described above and the developer solution. The developer solution in this case contains between 6-12% of hydrogen peroxide, and constituents of the formulation containing the color components can optionally also be added. The peroxide solution, however, must be thoroughly stabilized in this case.

Semipermanent Hair Dyes:

Semipermanent colorings have been developed to maintain the coloring for 6-10 washes with shampoo. So-called direct dyestuffs which essentially belong to the group of nitro, azo and anthraquinone dyestuffs are used in this case. These dyestuffs are small enough to penetrate into the hair. Formulations which are typically employed are solutions, creams, shampoos or also aerosol foams. The composition is comparable to the formulations containing the color component which are as permanent hair colorings.

Temporary Hair Dyes:

In contrast to the semipermanent hair dyes, temporary colorings, also called tints, contain larger dyestuff molecules which are not capable of penetrating into the hair. They have been developed to maintain the coloring for 1-6 washes. Azo and basic dyestuffs and azine and thiazine derivatives are typically employed in this case. The statements regarding the semipermanent and permanent hair dyes apply to the composition of the formulations. Dyestuffs and other ingredients of hair dyes are described in: A. Domsch, Die kosmetischen Präparate, Verlag für chem. Industrie, 4th edition, 1992. Dyestuffs are described in: Ordinance on cosmetic agents (Cosmetics Ordinance), Bundesgesetzblatt 1997, part I p. 2412, .sctn.3 and annex 3 and in European Community (EC) Directive, 76/68/EEC, annex IV The following recipes, which do not, however, limit the invention, in which each functional active compound can occur as an individual compound or as a mixture of several compounds of this category have been found to be particularly advantageous for the use of the mixtures containing the polycarbonate-polyorganosiloxane and/or polyurethane-polyorganosiloxane compounds according to the invention in cosmetic formulations.

A typical shampoo formulation according to the invention, which does not, however, limit the invention, for care and conditioning of hair comprises the following constituents in % by wt., in each case relative to the total formulation:

| | |
|---|---|
| 0.01-10% | Polycarbonate-polyorganosiloxane and/or polyurethane-polyorganosiloxane compounds according to the invention |
| 2-15% | Anionic surfactant |
| 0-10% | Amphoteric surfactant |
| 0-15% | Non-ionic surfactant |
| 0-10% | Cationic surfactant |
| 0-10% | Silicone-conditioners (co-adjuvants) |
| 0-10% | Auxiliary substances |
| to 100% | supplemented with water. |

A specific shampoo formulation, which does not, however, limit the invention, comprises the following constituents in % by wt.:

| | |
|---|---|
| 0.1-12% | Polycarbonate-polyorganosiloxane and/or polyurethane-polyorganosiloxane compounds according to the invention |
| 1-35% | sodium or ammonium lauryl or laureth sulfate (20-30%) |
| 1-6% | Cocoamidopropylbetaine (25-35%) |
| 0-3% | Guar Hydroxypropyltrimonium Chloride |
| 0-5% | Polyquaternium-10 |
| 0-12% | Silicone-conditioners (co-adjuvants) |
| 0.01-1% | Disodium EDTA |
| 0.01-1% | Phenoxyethynol (and) methylparaben (and) butylparaben (and) ethylparaben (and) propylparaben |
| 0-1% | Perfume (fragrance) |
| 0-1% | Dyestuffs |
| 0-1% | Citric acid |
| 0-2% | Sodium chloride |
| to 100% | supplemented with water. |

A typical hair conditioner according to the invention, which does not, however, limit the invention, for care and conditioning of hair comprises the following constituents in % by wt.:

| | |
|---|---|
| 0.1-15% | Polycarbonate-polyorganosiloxane and/or polyurethane-polyorganosiloxane compounds according to the invention |
| 0-10% | Amphoteric surfactant |
| 0.1-15% | Non-ionic surfactant |
| 0-10% | Cationic surfactant |
| 0-15% | Silicone-conditioners (co-adjuvants) |
| 0-20% | Auxiliary substances |
| to 100% | supplemented with water. |

A specific composition of a hair conditioner, which does not, however, limit the invention, comprises the following constituents in % by wt.:

| | |
|---|---|
| 0.5-15% | polycarbonate-polyorganosiloxane and/or polyurethane-polyorganosiloxane compounds according to the invention (as a 43.5% emulsion in water with non-ionic emulsifiers) |
| 0-15% | Silicone-conditioners (co-adjuvants) |
| 0-10% | Cetrimonium chloride (25-35%) |
| 0-3% | Guar Hydroxypropyltrimonium Chloride |
| 1-10% | Cetearyl alcohol |
| 0-10% | Glycerin |
| 0.01-1% | Phenoxyethynol (and) methylparaben (and) butylparaben (and) ethylparaben (and) propylparaben |
| 0-1% | Perfume (fragrance) |
| 0-1% | Dyestuffs |
| 0-1% | Citric acid |
| to 100% | supplemented with water. |

A typical hair care treatment according to the invention, which does not, however, limit the invention, for care and conditioning of hair comprises the following constituents in % by wt.:

| | |
|---|---|
| 0.4-20% | Polycarbonate-polyorganosiloxane and/or polyurethane-polyorganosiloxane compounds according to the invention |
| 0-15% | Non-ionic surfactant |
| 0-10% | Cationic surfactant |
| 0-20% | Silicone-conditioners (co-adjuvants) |
| 0-20% | Auxiliary substances |
| to 100% | supplemented with water. |

A specific hair care treatment, which does not, however, limit the invention, comprises the following constituents in % by wt.:

| | |
|---|---|
| 1-20% | polycarbonate-polyorganosiloxane and/or polyurethane-polyorganosiloxane compounds according to the invention (as a 43.5% emulsion in water with non-ionic emulsifiers) |
| 0.5-10% | Stearyl alcohol (and) Steareth-7 (and) Steareth-10 |
| 0-20% | Silicone-conditioners (co-adjuvants) |
| 0-10% | Cetrimonium chloride (25-35%) |
| 0-3% | Guar Hydroxypropyltrimonium Chloride |
| 0-5% | Dimethicones |
| 0-5% | Paraffin oil |
| 1-10% | Stearyl alcohol |
| 0-10% | Glycerin |
| 0.01-1% | Phenoxyethynol (and) methylparaben (and) butylparaben (and) ethylparaben (and) propylparaben |
| 0-1% | Perfume (fragrance) |
| 0-1% | Dyestuffs |
| 0-1% | Citric acid |
| 0-2% | Sodium chloride |
| to 100% | supplemented with water. |

A quite specific hair care treatment, which does not, however, limit the invention, comprises the following constituents in % by wt.:

| | |
|---|---|
| 2-5% | polycarbonate-polyorganosiloxane and/or polyurethane-polyorganosiloxane compounds according to the invention (as a 43.5% emulsion in water with non-ionic emulsifiers) |
| 0-5% | Silicone-conditioners (co-adjuvants) |
| 0-2% | Cetrimonium chloride (25-35%) |
| 0.5-5% | Glycerin |
| 0.25-2.5% | Propylene glycol |
| 0.05-0.2% | Perfume |
| 0.1-0.5% | Polysorbate 20 |
| to 100% | supplemented with water. |

A typical dyestuffs-containing formulation according to the invention, which does not, however, limit the invention, for temporary, semipermanent or permanent hair coloring, care and conditioning of hair comprises the following constituents in % by wt.:

| | |
|---|---|
| 0.1-10% | Polycarbonate-polyorganosiloxane and/or polyurethane-polyorganosiloxane compounds according to the invention |
| 1-10% | Hair dyestuff precursors or dyestuffs, depending on desired hair color |
| 0-15% | Anionic surfactant |
| 0-10% | Amphoteric surfactant |
| 0-10% | Non-ionic surfactant |
| 0-10% | Cationic surfactant |
| 0-1% | Sodium sulfite |
| 0-5% | Buffer |
| 0-10% | Silicone-conditioners (co-adjuvants) |
| 0-10% | Auxiliary substances |
| to 100% | Water. |

A specific color cream according to the invention, which does not, however, limit the invention, for permanent hair coloring comprises the following constituents in % by wt.:

| | |
|---|---|
| 0.1-10% | polycarbonate-polyorganosiloxane and/or polyurethane-polyorganosiloxane compounds according to the invention (as a 20% emulsion in water with non-ionic emulsifiers) |
| 1-5% | Hair dyestuff precursors or dyestuffs, depending on desired hair color |
| 2-15% | Anionic surfactant |
| 0-10% | Amphoteric surfactant |
| 0-10% | Non-ionic surfactant |
| 0-10% | Cationic surfactant |
| 0.1-1% | Sodium sulfite |
| 0.1-5% | Buffer for pH = 8-12 |
| 0-10% | Silicone-conditioners (co-adjuvants) |
| 0-10% | Auxiliary substances |
| to 100% | Water. |

A specific color solution according to the invention, which does not, however, limit the invention, for permanent hair coloring comprises the following constituents in % by wt.:

| | |
|---|---|
| 0.1-10% | polycarbonate-polyorganosiloxane and/or polyurethane-polyorganosiloxane compounds according to the invention (as a 20% emulsion in water with non-ionic emulsifiers) |
| 1-5% | Hair dyestuff precursors or dyestuffs, depending on desired hair color |
| 0.1-1% | Sodium sulfite |
| 5-15% | Propylene glycol |
| 5-15% | Ammonia (28%) |
| 10-30% | Oleic acid |
| 5-15% | Isopropanol |
| 10-30% | Alkanolamide |
| 0-10% | Silicone-conditioners (co-adjuvants) |
| to 100% | Water. |

A typical developer formulation according to the invention, which does not, however, limit the invention, for permanent hair coloring comprises the following constituents in % by wt.:

| | |
|---|---|
| 0.1-10% | Polycarbonate-polyorganosiloxane and/or polyurethane-polyorganosiloxane compounds according to the invention |
| 10-30% | Hydrogen peroxide (30%) |
| 0-15% | Anionic surfactant |
| 0-10% | Amphoteric surfactant |
| 0-10% | Non-ionic surfactant |
| 0-10% | Cationic surfactant |
| 0-5% | Buffer or acid for pH = 2-6 |
| 0-10% | Silicone-conditioners (co-adjuvants) |
| 0-10% | Auxiliary substances |
| to 100% | Water. |

A specific developer cream according to the invention, which does not, however, limit the invention, for permanent hair coloring comprises the following constituents in % by wt.:

| | |
|---|---|
| 0.1-5% | polycarbonate-polyorganosiloxane and/or polyurethane-polyorganosiloxane compounds according to the invention (as a 20% emulsion in water with non-ionic emulsifiers) |
| 10-30% | Hydrogen peroxide (30%) |
| 0-5% | Silicone-conditioners (co-adjuvants) |
| 1-10% | Cetearyl alcohol |
| 0.5-5% | Trideceth-2 carboxamide MEA |

| | |
|---|---|
| 0.5-5% | Ceteareth-30 |
| 0.5-5% | Glycerin |
| 0.05-2% | Pentasodium pentetate (pentasodium diethylenetriaminepentaacetate |
| 0.05-2% | sodium stannate |
| 0.05-2% | Tetrasodiumpyro phosphate |
| to 100% | Water. |

It has been found in this case that the solutions or mixtures according to the invention are preferably suitable for the preparation of cosmetic formulations, such as for the treatment, conditioning, cleansing and/or care of colored substrates or substrates which are to be colored.

That is to say, the formulations containing at least one polycarbonate-polyorganosiloxane and/or polyurethane-polyorganosiloxane compound invention can be employed in particular for cleansing, care and conditioning of fibrous or flat substrates, and if these are colored and the color impression thereof is to be largely retained.

The formulations containing at least one polycarbonate-polyorganosiloxane and/or polyurethane-polyorganosiloxane compound according to the invention can furthermore serve for the cleansing, care and the treatment and the conditioning of keratin-containing substrates, since they are suitable as cleansing compositions for wool, for washing and/or increasing the volume and/or the ease of combing and/or the gloss and/or for reducing the washing out of the color from and out of colored keratin-containing substrates or from keratin-containing substrates which are simultaneously to be colored, such as e.g. human and animal hair.

The formulations containing at least one polycarbonate-polyorganosiloxane and/or polyurethane-polyorganosiloxane compound according to the invention can furthermore be used in particular for the cleansing, care and the treatment, cleansing and care of keratin-containing fibres or hair before, during and/or after the coloring operation, since the hair dyes formulated therewith lead simultaneously to an improvement in the softness and/or to a reduction in the wet and dry combing forces and/or to an increase in the gloss and/or to an increase in the hair volume and/or to a reduction in the washing out of dyestuffs from and out of tinted and dyed hair.

Softener Formulations

With respect to the administration form, on the one hand it is possible to incorporate the polycarbonate-polyorganosiloxane and/or polyurethane-polyorganosiloxane compounds according to the invention into non-transparent softener dispersions or softener emulsions or transparent micro-emulsions or solutions.

Typical further components for such non-transparent or transparent formulations are:

quaternary ammonium compounds, preferably quaternary ammonium compounds containing alkanoic acid ester units, as softeners, organic solvents, preferably mono- and polyhydric alcohols, such as ethanol, 2-propanol, ethylene glycol, 1,2-propylene glycol, hexylene glycol, dipropylene glycol, esters and ethers of glycols and oligoglycols, such as dipropylene glycol monobutyl ether, tripropylene glycol monomethyl ether, diethylene glycol diacetate, to improve the solubility and transparency of the formulation, Diols and higher alcohols of longer-chain hydrocarbons, for example 2,2,4-trimethyl-1,3-pentanediol, to increase the solubilizability of the softener components, nonionogenic surfactants, preferably alkoxylates of branched or unbranched C8 to C40 alcohols and fatty acid esters of alkylene oxides for stabilizing emulsions or preparation of micro-emulsions Perfumes Viscosity regulators Dyestuffs Preservatives The additional functional components listed and preferred representatives are known, for example, from U.S. Pat. No. 6,376,455.

On the other hand, it is possible to apply the polycarbonate-polyorganosiloxane and/or polyurethane-polyorganosiloxane compounds according to the invention to solid carriers in the context of laundry freshener systems, and then to bring these into contact, in the laundry dryer, with textiles which are to be freshened and/or softened. Laundry freshener systems with carriers and functional components thereof are known, for example, from U.S. Pat. No. 4,824,582, U.S. Pat. No. 4,808,086, U.S. Pat. No. 4,756,850, U.S. Pat. No. 4,749,596 and U.S. Pat. No. 3,686,025.

Typical components for such laundry freshener systems with carriers are:

fatty amines or complexes thereof with anionic surfactants as conditioning agent quaternary ammonium compounds, preferably quaternary ammonium compounds containing alkanoic acid ester units, as softeners, nonionogenic softeners, for example based on sorbitan esters or fatty alcohol alkoxylates "soil release agents", for example based on cellulose ethers, guar gum or terephthalic acid block copolymers.

The carrier material is a sponge-like or porous sheet-like material which has a sufficient capacity for uptake of the laundry freshener formulation. "Woven" and nonwoven" materials are employed. They are materials based on natural or synthetic polymers, such as wool, cotton, sisal, linen, cellulose esters, polyvinyl compounds, polyolefins, polyamides, polyurethanes and polyesters.

EXAMPLES

Example 1

100 g (1.08 mol) glycerin, 293.5 g (3.258 mol) dimethylcarbonate and 1.2 g diazabicyclooctane are mixed and heated to 80° C. for 16 hours in a flask under an N$_2$ atmosphere. During the reaction, the temperature in the gas space above the liquid level drops to 64° C.

All components that are volatile to 50° C./20 mbar are drawn off. 126 g of a yellow clear liquid are obtained.

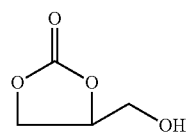

Example 2

60 g (0.509 mol) glycerolcarbonate are provided in a flask under an N$_2$ atmosphere

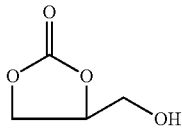

and heated to 60° C. 69 g (0.509 mol) chloroacetic acid chloride are added dropwise in such a way that the temperature levels out at 70° C. After dropwise addition is complete, stirring is carried out for 8 hours.

All components that are volatile to 50° C./20 mbar are drawn off. 89 g of a yellowish-red liquid are obtained.

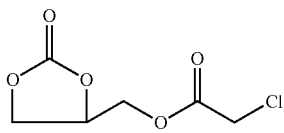

Intensity ratio $^1$H-NMR:

| | |
|---|---|
| —CH$_2$—Cl | (2H) 48 |
| —CH$_2$OC(O) | (2H) 46 |
| —OCH$_2$— | (carbonate ring 2H) 47 |
| —OCH— | (carbonate ring 1H) 23 |

Example 3

In a flask under an N$_2$ atmosphere, 3.89 (0.02 mol) of the chloroacetic acid ester of glycerolcarbonate

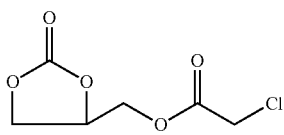

and 1.72 g (0.01 mol) N,N,N',N'-tetramethyl hexanediamine are dissolved in 51.8 g propylene glycol monomethyl ether and heated to 80° C. for 8 hours.

Then, 46.23 g (0.01 mol) of an aminopropyl-substituted siloxane of the structure

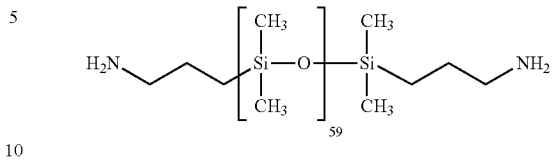

are added dropwise and the temperature is increased to 120° C. for 10 hours.

A brownish opaque liquid is obtained which contains a polymer with the following structural elements.

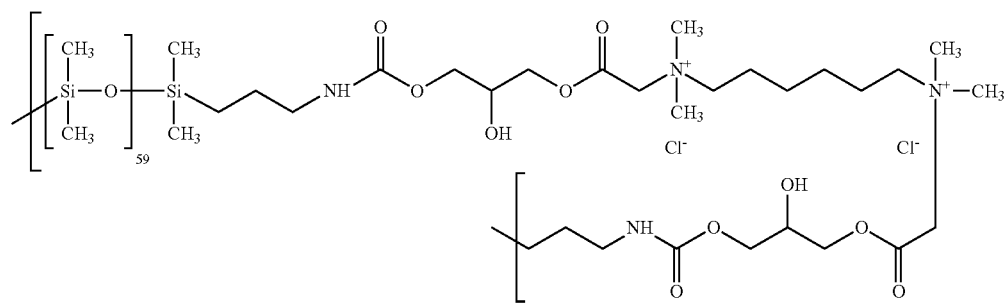

Example 4

In a flask under an N$_2$ atmosphere, 3.89 g (0.02 mol) of the chloroacetic acid ester of glycerolcarbonate

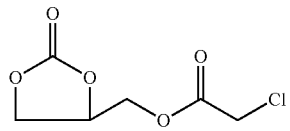 [SMILES: O=C(CCl)OCC1COC(=O)O1]

and 1.72 g (0.01 mol) N,N,N',N'-tetramethyl hexanediamine are dissolved in 51.8 g propylene glycol monomethyl ether and heated to 80° C. for 8 hours.

Then, 23.12 g (0.005 mol) of an aminopropyl-substituted siloxane of the structure

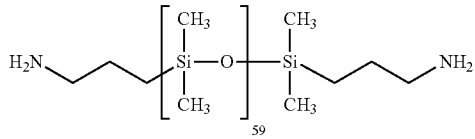

and 3.17 g (0.005 mol) Jeffamin ED 600 (Huntsman Corp.), an amino-terminated polyether of the structure

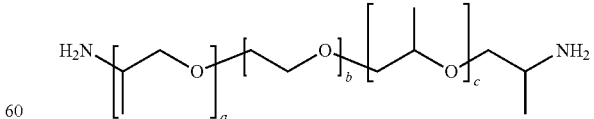

wherein a+c=3.6 and b=9, are added dropwise and the temperature is increased to 120° C. for 10 hours.

A brownish opaque liquid is obtained which contains a polymer with the following structural elements in a molar ratio of 1:1.

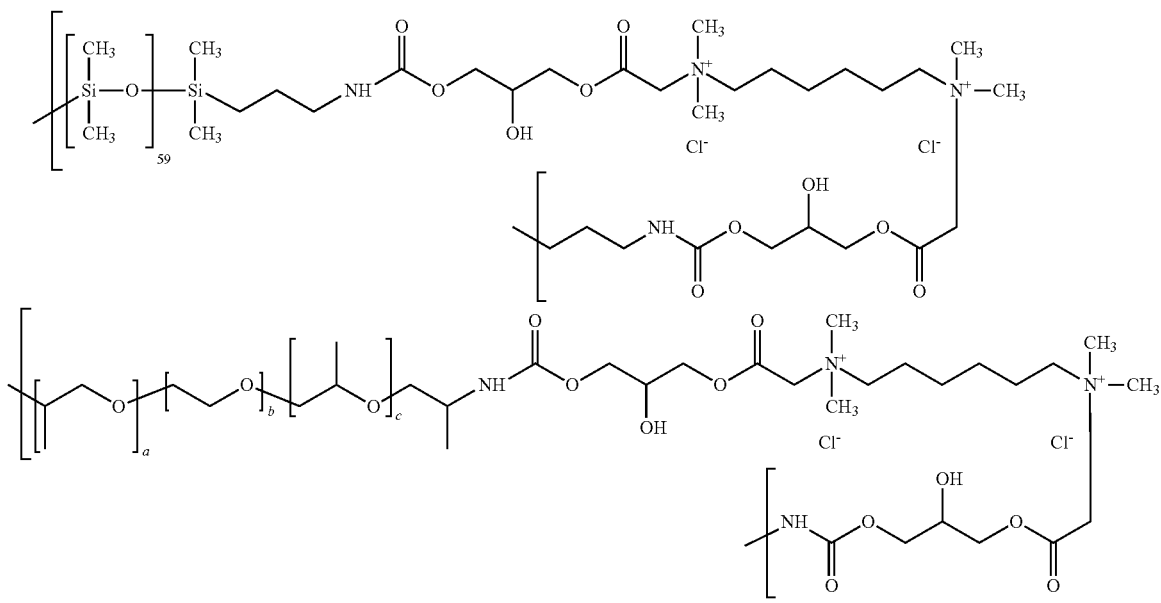

wherein a+c=3.6 and b=9

Example 5

In a flask under an $N_2$ atmosphere, 39.21 (0.01 mol) of an epoxy siloxane of the structure

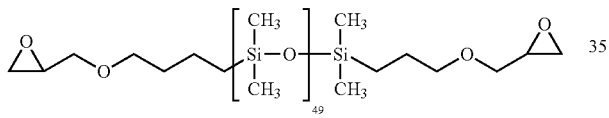

and 2 g (0.02 mol) N-methylpiperazine are dissolved in 50.4 g propylene glycol monomethyl ether and heated to 8° C. for 80 hours.

Then, 3.89 g (0.02 mol) of the chloroacetic ester of the glycerolcarbonate

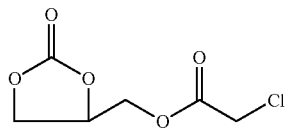

is added dropwise and the mixture is kept at 80° C. for another 8 hours.

Finally, 6.33 g (0.01 mol) Jeffamin ED 600 (Huntsman Corp.), an amino-terminated polyether of the structure

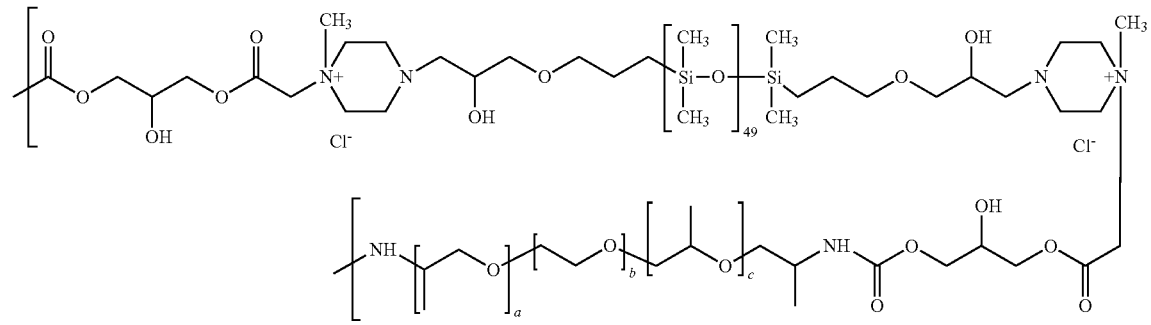

wherein a+c=3.6 and b=9, are added dropwise and the temperature is increased to 120° C. for 10 hours.

A brownish opaque liquid is obtained which contains a polymer with the following structural elements.

Example 6

In a flask under an N$_2$ atmosphere, 3.8 (0.01 mol) of a polypropylene glycol diglycidylether of the structure

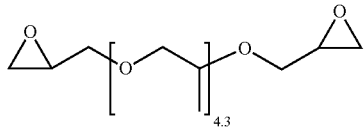

and 2 g (0.02 mol) N-methylpiperazine are dissolved in 90.1 g propylene glycol monomethyl ether and heated to 8° C. for 80 hours.

Then, 3.89 g (0.02 mol) of the chloroacetic ester of the glycerolcarbonate

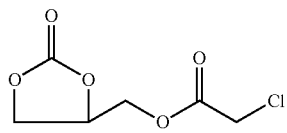 [SMILES: O=C(CCl)OCC1COC(=O)O1]

is added dropwise and the mixture is kept at 80° C. for another 8 hours.

Finally, 46.23 g (0.01 mol) of an amino siloxane of the structure

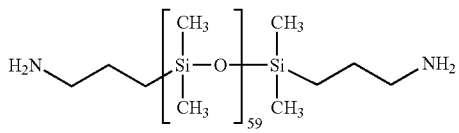

are added dropwise and the temperature is increased to 120° C. for 10 hours.

A brownish opaque liquid is obtained which contains a polymer with the following structural elements.

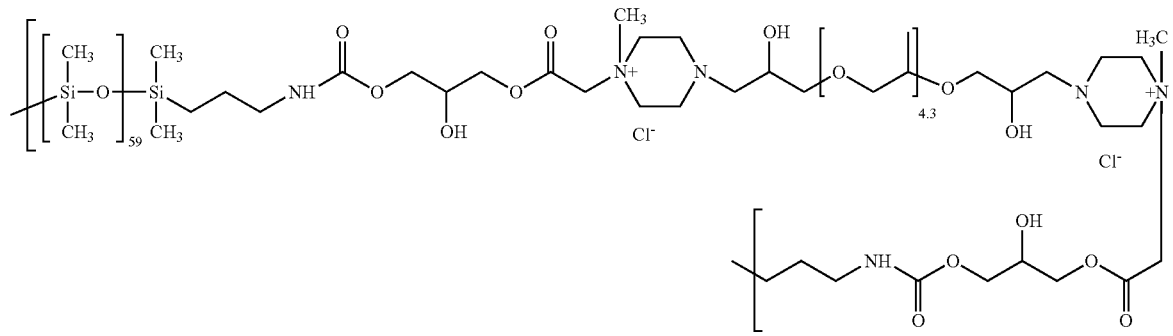

The products obtained in Examples 3, 4, 5 and 6, in an amount of 0.5-3%, can be worked into powdery and liquid laundry detergents based on anionic and/or non-ionogenic surfactants, and there produce a substantial soft feel.

The invention claimed is:
1. Compounds, comprising at least one structural element of the formula (1):

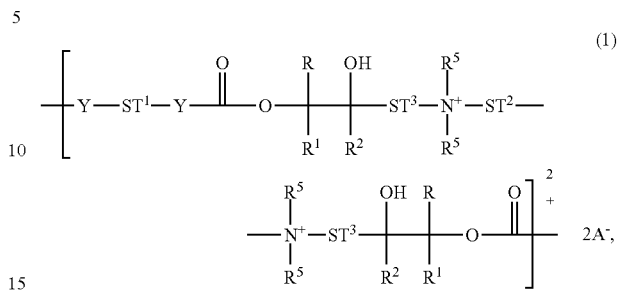

wherein
R is respectively selected from the group consisting of: hydrogen and alkyl,
$R^1$ is respectively selected from the group consisting of: hydrogen and alkyl,
$R^2$ is respectively selected from the group consisting of: hydrogen and alkyl,
$ST^1$ is a di- or polyvalent, straight-chained, cyclic or branched, saturated, unsaturated or aromatic, substituted or unsubstituted hydrocarbon residue with up to 1000 carbon atoms, which may contain one or more groups selected from:
—O—,
—C(O)—,
—NH—,
—NR$^3$—, wherein R$^3$ is defined as below, and
a polyorganosiloxane unit with 2 to 1000 silicon atoms,
Y is selected independently from one another from: —O—, —S— and —NR$^6$—, wherein R$^6$ is hydrogen or a straight-chained, cyclic or branched, saturated, unsaturated or aromatic hydrocarbon residue with up to 40 carbon atoms, which may contain one or more groups selected from —O—, —C(O)—, —NH— and —NR$^3$—, wherein R$^3$ is defined as below, or two residues R$^6$ together form an alkylene residue while forming a cyclic structure with ST$^1$, or one or more residues R$^6$ represent a bond to ST$^1$ while forming one or more cyclic structures with ST$^1$, ST$^2$ is a di- or polyvalent, straight-chained, cyclic or branched, saturated, unsaturated or aromatic, substituted or unsubstituted hydrocarbon residue with up to 1000 carbon atoms, which may contain one or more groups selected from:

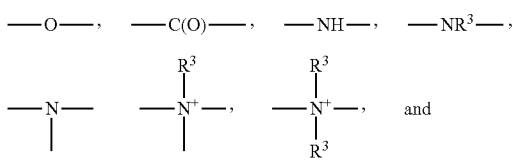

a polyorganosiloxane unit with 2 to 1000 silicon atoms, wherein $R^3$ is a straight-chained, cyclic or branched, saturated, unsaturated or aromatic hydrocarbon residue with up to 100 carbon atoms, which may contain one or more groups selected from —O—, —C(O)— and —NH—, and may optionally be substituted by a silyl group, and $R^5$ is a straight-chained, cyclic or branched, saturated, unsaturated or aromatic hydrocarbon residue with up to 100 carbon atoms, which may contain one or more groups selected from —O—, —C(O)— and —NH—, and may optionally be substituted by a silyl group, or two of the residues $R^3$ form an alkylene residue, or one or more of the residues $R^5$ form a bond to the residue $ST^2$ while forming cyclic structures, $ST^3$ is a di- or polyvalent, straight-chained, cyclic or branched, saturated, unsaturated or aromatic, substituted or unsubstituted hydrocarbon residue with up to 30 carbon atoms, which may contain one or more groups selected from:
—O—,
—C(O)—, $A^-$ is an organic or inorganic anion, wherein at least 10 mol-% of the total of structural elements $ST^1$ and $ST^2$ contain a polydiorganosiloxane unit.

2. Compound according to claim 1, wherein at least one of the residues R, $R^1$ and $R^2$ is hydrogen.

3. Compound according to claim 2, wherein the residues R, $R^1$ and $R^2$ are hydrogen.

4. Compounds according to claim 2, wherein the compounds comprise more than one structural element of the formula (1).

5. Compounds according to claim 1, wherein the compounds comprise more than one polydiorganosiloxane unit.

6. The compounds of claim 1, wherein the compounds are linear.

7. Compounds according to claim 1, wherein $ST^1$, $ST^2$ and $ST^3$ are each divalent residues.

8. The compounds of claim 1, wherein the compounds are branched.

9. Branched compounds according to claim 8, wherein the branching takes place via at least one of the residues $ST^1$ or $ST^2$.

10. Compound according to claim 1, containing at least one polyorganosiloxane residue of the formula (4):

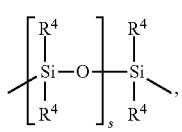 (4)

wherein $R^4$ is a straight-chained, cyclic or branched, saturated, unsaturated or aromatic hydrocarbon residue with up to 20 carbon atoms, and/or $R^4$ is an alkoxy residue, the alkyl part of which is a straight-chained, cyclic or branched, saturated alkyl residue with up to 20 carbon atoms, which may contain one or more oxygen atoms, and s=1 to 999.

11. Compounds according to claim 1, wherein $Y$=—$NR^6$—.

12. Compound according to claim 1, wherein $Y$=—NH—.

13. Compounds according to claim 1, further comprising at least one polyether group.

14. Compounds according to claim 1, wherein $ST^1 \ne ST^2$.

15. Compounds according to claim 10, wherein at least one of $ST^1$ and $ST^2$ contains a structural element of the following formula

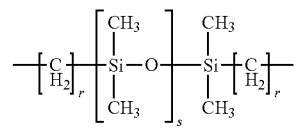

wherein
r=1 to 12.

16. Compounds according to claim 1, wherein

R, $R^1$ and $R^2$=hydrogen, $ST^1$=straight-chained or cyclic or branched, saturated or unsaturated or aromatic hydrocarbon residue with 2 to 200 carbon atoms, which may optionally contain —O—, —C(O)— and/or a polydiorganosiloxane unit with 2 to 200 silicon atoms, $ST^2$=straight-chained or cyclic or branched, saturated or unsaturated or aromatic hydrocarbon residue with 2 to 200 carbon atoms, which may contain —O—, —C(O)—, —NH—, —$NR^3$—, and optionally a polydiorganosiloxane unit with 2 to 200 silicon atoms, wherein $R^3$=straight-chained or cyclic or branched, saturated or unsaturated or aromatic hydrocarbon residue with up to 10 carbon atoms, which may contain —O—, —C(O)— and —NH—, $ST^3$=a divalent, straight-chained, substituted or unsubstituted hydrocarbon residue with up to 20 carbon atoms, which contains one or more groups selected from —O— und —C(O)—, $Y$=—$NR^6$—, wherein $R^6$=hydrogen or a straight-chained, cyclic or branched, saturated, unsaturated or aromatic hydrocarbon residue with up to 10 carbon atoms, which may contain one or more groups selected from —O—, —C(O)—, —NH— and —$NR^3$—, wherein $R^3$ is defined as above, and $R^5$=straight-chained or cyclic or branched, saturated or unsaturated or aromatic hydrocarbon residue with up to 25 carbon atoms, which may contain —O—, —C(O)—, —NH—, or two of the residues $R^5$ form an alkylene residue, or one or more of the residues $R^5$ form a bond to the residue $ST^2$ while forming cyclic structures, $A^-$=an anion selected from the group consisting of inorganic anion, such as halogenide, organic anion, carboxylate, alkyl sulfate, and sulfonate, provided that at least one of the structural elements $ST^1$ and $ST^2$ comprises a polydiorganosiloxane unit.

17. Compounds according to claim 1, wherein
R, $R^1$ and $R^2$=hydrogen,
$ST^1$=straight-chained or cyclic or branched, saturated or unsaturated or aromatic hydrocarbon residue with 2 to 100 carbon atoms, which may optionally contain —O—, —C(O)— and/or a polydiorganosiloxane unit with 2 to 100 silicon atoms,
$ST^2$=straight-chained or cyclic or branched, saturated or unsaturated or aromatic hydrocarbon residue with 2 to 100 carbon atoms, which may contain —O—, —C(O)—, —NH—, —$NR^3$—, and optionally a polydiorganosiloxane unit with 2 to 100 silicon atoms, wherein
$R^3$=straight-chained or cyclic or branched, saturated or unsaturated or aromatic hydrocarbon residue with up to 7 carbon atoms, which may contain —O—, —C(O)— and —NH—,
$ST^3$=a divalent, straight-chained hydrocarbon residue with up to 10 carbon atoms, which contains one or more groups selected from —O— und —C(O)—,
Y=—$NR^6$—, wherein
$R^6$=hydrogen or a straight-chained, cyclic or branched, saturated, unsaturated or aromatic hydrocarbon residue with up to 7 carbon atoms, which may contain one or more groups selected from —O—, —C(O)—, —NH— and —$NR^3$—, wherein $R^3$ is defined as above, and
$R^5$=straight-chained or cyclic or branched, saturated or unsaturated or aromatic hydrocarbon residue with up to 6 carbon atoms, which may contain —O—, —C(O)—, —NH—, or
two of the residues $R^5$ form a C2- to C3-alkylene residue, or
one or more of the residues $R^5$ form a bond to the residue $ST^2$ while forming cyclic structures,
$A^-$=An anion selected from the group consisting of inorganic anions, halogenide, chloride, organic anion, carboxylate, C2- to C18-carboxylate, alkylpolyether carboxylate, alkyl sulfate, methosulfate, sulfonate, alkyl sulfonate, alkylaryl sulfonate, and toluoyl sulfonate.

18. Compounds according to claim 1, wherein at least 10 mol-% of the structural elements $ST^1$ and $ST^2$ contain a polydiorganosiloxane unit.

19. A composition comprising the compound of claim 1, wherein the composition is selected from the group consisting of coatings, agents for surface modification, elastomers, duromers, adhesives, primers for metal or plastic surfaces, polymer additives, laundry detergent additives, rheological agents, cosmetic agents, fiber modification agents.

20. The composition of claim 19 wherein the composition is a modification agent for thermoplastic synthetic materials.

21. The composition of claim 20, wherein the modifying agents are low-temperature impact-resistance modifiers.

22. The composition of claim 20, wherein the modification agent is selected from the group consisting of: viscosity regulators, anti-static agents, anti-fogging agents, mixture components for silicone rubbers that can be cross-linked peroxidically or by hydrosilylation (platinum catalysis) to form elastomers, softeners for textile fibers for the treatment of the textile fibers prior to, during and after washing, agents for modifying natural and synthetic fibers, such as hair, cotton fibers and synthetic fibers, such as polyester fibers and polyamide fibers, as well as union fabric, textile finishing agents, as well as softeners for detergent-containing formulations, such as laundry detergents and cleaning products.

23. Laundry detergent formulations, cosmetic formulations or formulations for fiber treatment, containing at least one polycarbonate-polyorganosiloxane and/or polyurethane-polyorganosiloxane compound according to claim 1.

* * * * *